US008443189B2

(12) United States Patent
Li et al.

(10) Patent No.: US 8,443,189 B2
(45) Date of Patent: May 14, 2013

(54) TRUST EVENT NOTIFICATION AND ACTIONS BASED ON THRESHOLDS AND ASSOCIATED TRUST METADATA SCORES

(75) Inventors: Chung-Sheng Li, Edgemont, NY (US); Ivan Matthew Milman, Austin, TX (US); Guenter Anton Sauter, Ridgefield, CT (US); Harald Clyde Smith, Groveland, MA (US); Charles Daniel Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/257,878

(22) Filed: Oct. 24, 2008

(65) Prior Publication Data

US 2010/0107244 A1   Apr. 29, 2010

(51) Int. Cl.
*H04L 29/06* (2006.01)
*G06F 7/04* (2006.01)

(52) U.S. Cl.
USPC ............. 713/166; 713/150; 713/165; 726/2; 726/27

(58) Field of Classification Search ............. 713/1, 150, 713/165, 166; 726/2, 27
See application file for complete search history.

(56) References Cited

U.S. PATENT DOCUMENTS

| | | | |
|---|---|---|---|
| 5,191,348 A | 3/1993 | Brocia et al. ................... | 342/173 |
| 6,480,837 B1 | 11/2002 | Dutta .................................. | 1/1 |
| 6,611,825 B1 | 8/2003 | Billheimer et al. ............. | 706/45 |
| 6,701,305 B1 | 3/2004 | Holt et al. ........................ | 706/45 |
| 6,836,463 B2 | 12/2004 | Garci-Luna-Aceves et al. ............................. | 370/238 |
| 7,240,213 B1 | 7/2007 | Ritter ............................. | 713/182 |
| 7,263,607 B2 | 8/2007 | Ingerman et al. ............. | 713/150 |
| 7,272,719 B2 * | 9/2007 | Bleckmann et al. .......... | 713/176 |
| 7,480,931 B2 * | 1/2009 | Weiss ................................. | 726/2 |
| 7,904,727 B2 * | 3/2011 | Bleckmann et al. .......... | 713/176 |
| 2002/0144149 A1 | 10/2002 | Hanna et al. ................... | 713/201 |
| 2003/0167308 A1 | 9/2003 | Schran .......................... | 709/205 |

(Continued)

FOREIGN PATENT DOCUMENTS

| | | |
|---|---|---|
| JP | 1528498 A2 | 5/2005 |
| JP | 2005135071 A | 5/2005 |
| JP | 2005322089 A | 11/2005 |
| JP | 2007041835 A | 2/2007 |

OTHER PUBLICATIONS

Nelson et al., "Customer Data Quality and Integration: The Foundation of Successful CRM," Strategic Analysis Report, Gartner, Inc., Nov. 26, 2001.

(Continued)

*Primary Examiner* — Mohammad W Reza
(74) *Attorney, Agent, or Firm* — Van Leeuwen & Van Leeuwen; Jeffrey S. LaBaw

(57) ABSTRACT

An approach is provided for selecting one or more trust factors from trust factors included in a trust index repository. Thresholds are identified corresponding to one or more of the selected trust factors. Actions are identified to perform when the selected trust factors reach the corresponding threshold values. The identified thresholds, identified actions, and selected trust factors are stored in a data store. The selected trust factors are monitored by comparing one or more trust metadata scores with the stored identified thresholds. The stored identified actions that correspond to the selected trust factors are performed when one or more of the trust metadata scores reach the identified thresholds. At least one of the actions includes an event notification that is provided to a trust data consumer.

17 Claims, 20 Drawing Sheets

U.S. PATENT DOCUMENTS

| | | | |
|---|---|---|---|
| 2004/0128544 A1 | 7/2004 | Hondo et al. | 713/201 |
| 2005/0283468 A1 | 12/2005 | Kamvar et al. | 707/3 |
| 2006/0168022 A1* | 7/2006 | Levin et al. | 709/206 |
| 2006/0212925 A1* | 9/2006 | Shull et al. | 726/1 |
| 2006/0212930 A1 | 9/2006 | Shull et al. | 726/10 |
| 2006/0230021 A1 | 10/2006 | Diab et al. | 707/3 |
| 2006/0294151 A1 | 12/2006 | Wong et al. | 707/200 |
| 2007/0106577 A1 | 5/2007 | Kopp et al. | 705/35 |
| 2007/0156514 A1 | 7/2007 | Wright et al. | 705/14.41 |
| 2007/0156604 A1 | 7/2007 | James | 705/64 |
| 2007/0156621 A1 | 7/2007 | Wright et al. | 706/48 |
| 2007/0156887 A1 | 7/2007 | Wright et al. | 709/224 |
| 2007/0180495 A1* | 8/2007 | Hardjono et al. | 726/3 |
| 2008/0015916 A1* | 1/2008 | Cossey et al. | 705/7 |
| 2008/0107037 A1 | 5/2008 | Forbes et al. | 370/242 |
| 2008/0209543 A1 | 8/2008 | Aaron | 726/17 |
| 2008/0261701 A1 | 10/2008 | Lewin et al. | 463/43 |
| 2009/0006230 A1 | 1/2009 | Lyda et al. | 705/35 |
| 2009/0024589 A1 | 1/2009 | Sood et al. | 707/3 |
| 2009/0235334 A1* | 9/2009 | Park | 726/4 |

OTHER PUBLICATIONS

"Global Risk Management Solutions, Global Data Management Survey 2001," PriceWaterhouseCoopers, 2000-2001.

Laney, "Customer Data Quality: Beyond the Bucket and Broom," META Group, Oct. 29, 2002.

Parreira et al., "Computing Trusted Authority Scores in Peer-to-Peer Web Search Networks," AIRWeb '07, May 8, 2007.

Stakhanova et al., "A reputation-based trust management in peer-to-peer network systems," 2004 International Workshop on Security in Parallel and Distributed Systems, 2004.

TrustGauge, Trustgauge.com, 2003-2009.

Shah et al., "Incorporation Trust in the BitTorrent Protocol," International Symposium on Performance Evaluation of Computer and Telecommunication Systems (SPECTS 2007), Jul. 16-18, 2007.

Office Action for U.S. Appl. No. 12/257,866, mailed Apr. 28, 2011, 11 pages.

Office Action for U.S. Appl. No. 12/257,856, mailed Feb. 17, 2011, 16 pages.

Final Office Action for U.S. Appl. No. 12/257,866 (Li et al., "Configurable Trust Context Assignable to Facts and Associated Trust Metadata," filed Oct. 24, 2008), mailed Oct. 27, 2011, 12 pages.

Notice of Allowance for U.S. Appl. No. 12/257,894 (Li et al., "Generating Composite Trust Value Scores Based on Assignable Priorities, Atomic Metadata Values and Associated Composite Trust Value Scores," filed Oct. 24, 2008), mailed Sep. 26, 2011, 11 pages.

Final Office Action for U.S. Appl. No. 12/257,856 (Li et al., "Trust Index Framework for Providing Data and Associated Trust Metadata," filed Oct. 24, 2008, mailed Aug. 2, 2011, 17 pages.

"OWL Web Ontology Language Overview," W3C, Feb. 10, 2004, 22 pages.

Notice of Allowance for U.S. Appl. No. 12/604,664 (Kache et al., "Monitoring Information Assets and Information Asset Topologies,", mailed May 21, 2012, 16 pages.

* cited by examiner

TRUST EVENT NOTIFICATION AND ACTIONS BASED ON THRESHOLDS AND ASSOCIATED TRUST METADATA SCORES

BACKGROUND OF THE INVENTION

1. Technical Field

The present invention relates to an approach for assessing the trust of data information, and related metadata. More particularly, the present invention relates to an approach for assessing trust of data, information and related metadata used by an business or organization.

2. Description of the Related Art

Many consumers of information—organizations and individuals—struggle with the uncertainty of trust in the information that they need to consume. Based on this struggle as well as the struggle of others, they know that the information that they are consuming can sometimes be trusted, and at other times not trusted. A challenge in the current state of the art is that information consumers do not know when and why they can trust information and which information they can trust. Often, the only reasonable approach for information consumers is to assume—with some level of doubt—that the information can be trusted until problems occur. Information providers have a similar challenge. Not all of the information is managed in the same way and may therefore have different levels of trust. Today, the information provider is challenged in distinguishing between the varying degrees of trust when delivering the information to the information consumer. Problems with possibly a small set of their information may reduce significantly the value of the overall provider system as the consumer does not know which information can be trusted.

SUMMARY

It has been discovered that the aforementioned challenges are resolved by selecting one or more trust factors from trust factors included in a trust index repository. Thresholds are identified corresponding to one or more of the selected trust factors. Actions are identified to perform when the selected trust factors reach the corresponding threshold values. The identified thresholds, identified actions, and selected trust factors are stored in a data store. The selected trust factors are monitored by comparing one or more trust metadata scores with the stored identified thresholds. The stored identified actions that correspond to the selected trust factors are performed when one or more of the trust metadata scores reach the identified thresholds. At least one of the actions includes an event notification that is provided to a trust data consumer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
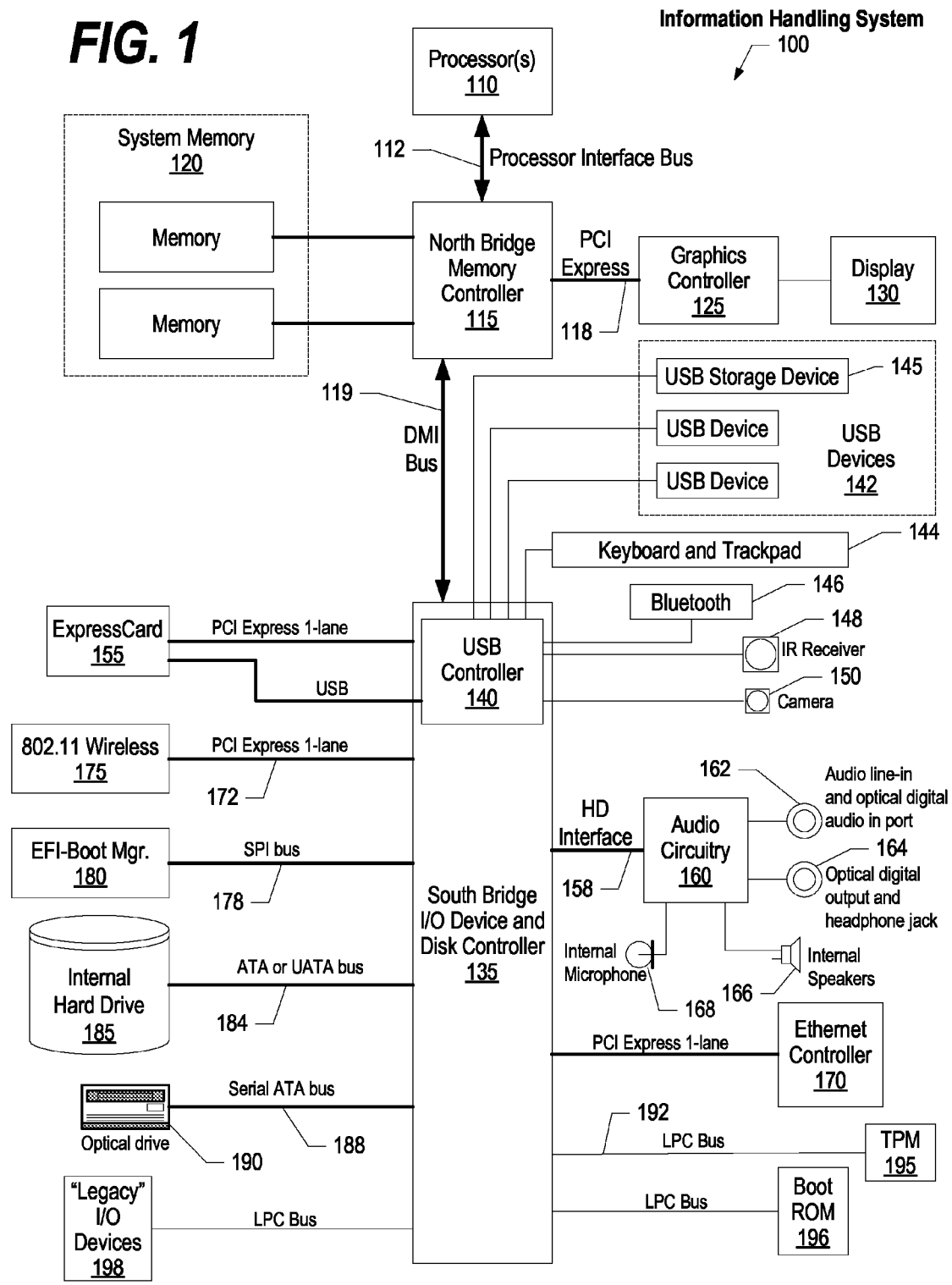
FIG. 1 is a block diagram of a data processing system in which the methods described herein can be implemented.
Figure 2:
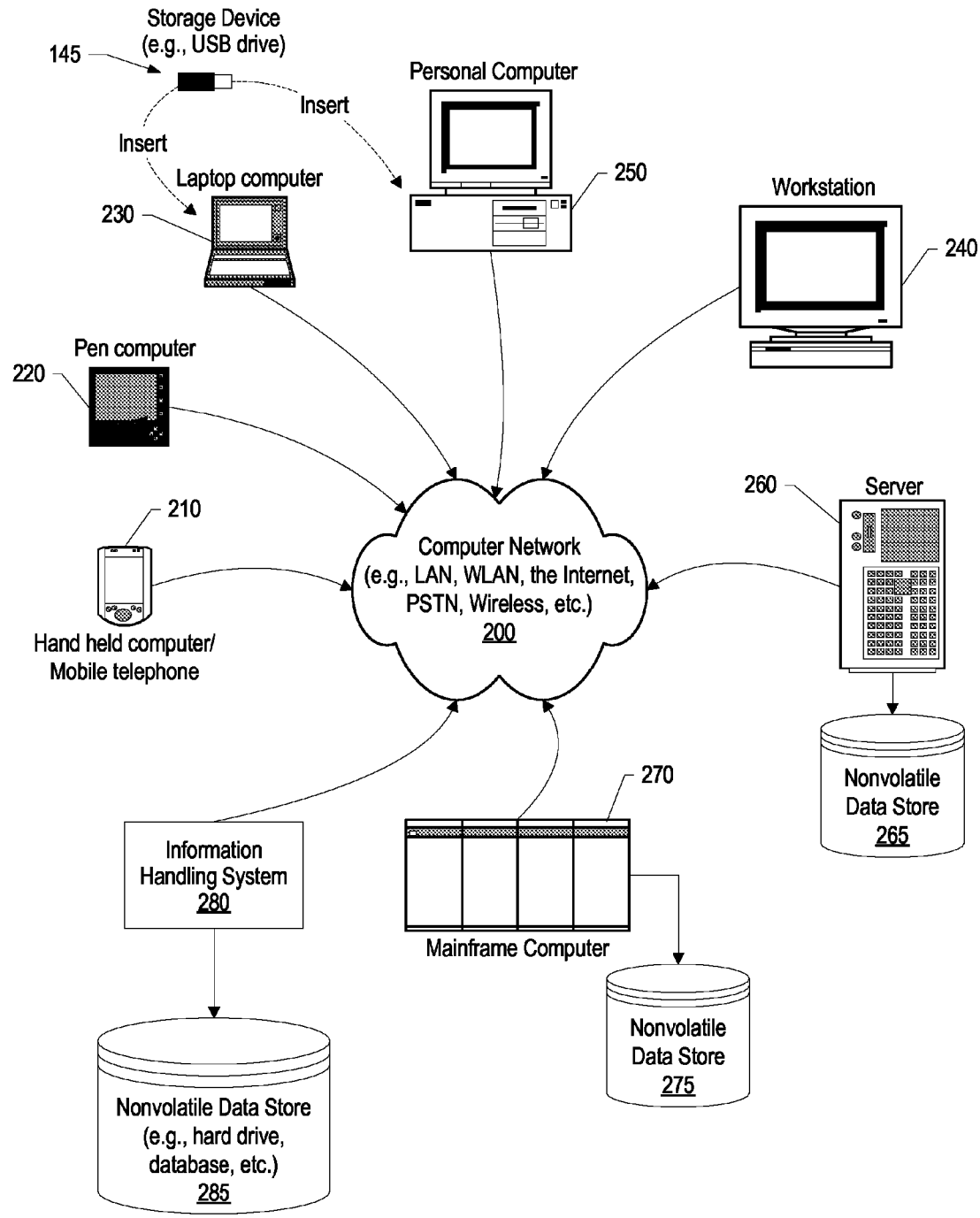
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which are coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
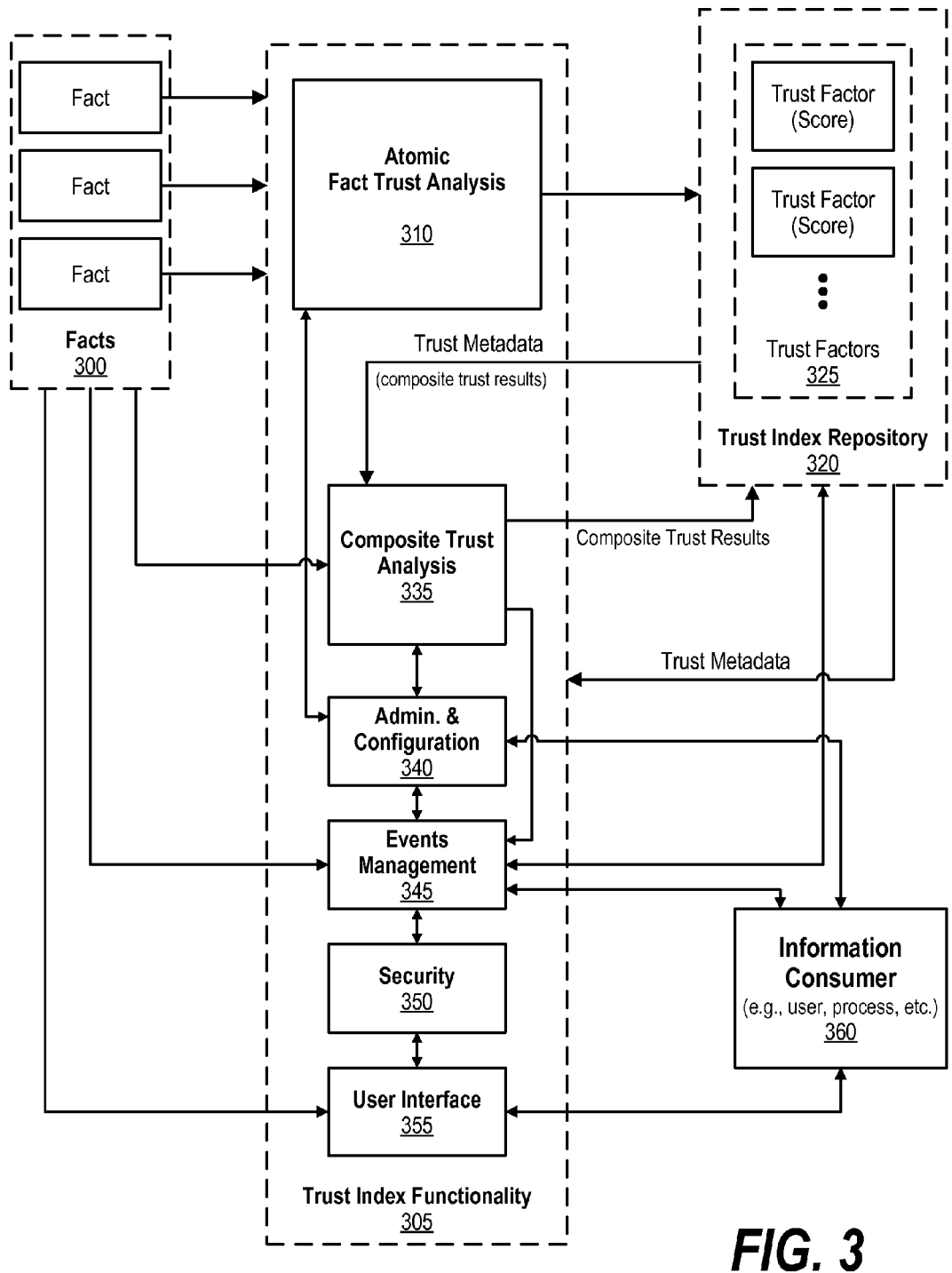
FIG. 3 is a diagram of trust index functionality components gathering facts and trust metadata and interfacing with a trust index repository to provide trust data to an information consumer.

FIG. 3 is a diagram of trust index functionality components gathering facts and trust metadata and interfacing with a trust index repository to provide trust data to an information consumer. Facts 300 are processed by Trust Index Functionality 305 in order to gather metadata regarding the facts so that one or more levels of trust can be established for the facts. Trust Index Functionality 305 includes a number of components including Atomic Fact Trust Analysis 310 which analyzes the facts to create and update Trust Factors 325 which are stored in Trust Index Repository 320. Trust Factors 325 include both Atomic Trust Factors (resulting from Atomic Fact Trust Analysis 310) as well as Composite Trust Factors that result from Composite Trust Analysis 335. As shown, Composite Trust Analysis 335 is also included in Trust Index Functionality 305. A Composite Trust Factor can be created by analyzing multiple Atomic Trust Factors to create a composite value, or "score." In addition, one or more composite trust factors can be used, either alone or using additional atomic trust factors, to create other composite trust factor scores. In this manner, trust factors can be layered from atomic trust factors (scores) at the low end, to high-end composite trust factors (scores) that may, for example, provide an overall trust score for a particular data item. The atomic and composite trust factors (scores) are generated using various algorithms that analyze the data and trust factor scores to generate other trust factor scores. In addition, other metadata, such as priority values, can be included as input to the algorithm.

Administration and configuration process 340 is used to set up and administer the Trust Index Functionality. For example, the configuration is used to identify which data items (facts) are being analyzed for the organization. Other configuration operations include identifying the algorithms and other metadata items, such as priority values, that are used to generate trust factor scores. Administration is used to identify the users that are authorized to access various trust data stored in the trust index repository. For example, Information Consumer 360 may be an executive in the organization, such as a Chief Information Officer (CIO) or Chief Executive Officer (CEO). Executives likely have different data needs than a sales or marketing manager. The sales/marketing manager may have a need to access sales and marketing related data as well as its associated trust data maintained in Trust Index Repository 320, but does not have a need to access strategic business data. Likewise, the CIO or CEO likely has a need for the strategic business data. Consequently, process 340 identifies the roles that individuals have and their corresponding data access needs. Events management 345 monitors facts 300 and trust data that is generated and stored in Trust Index Repository 320. For example, an Information Consumer may wish to be alerted when a particular trust factor reaches a particular threshold. In one embodiment, a message is sent to a trust data consumer that includes trust metadata scores that reached the identified threshold. As shown, Information Consumer 360 can be an individual, such as an employee, or a separate process, such as a sales and marketing computer system, that interacts with Trust Index Functionality 305.

Security 350 is used to ensure that individuals and processes access data that is applicable to the particular Information Consumer as established by Administration process 340. In addition, security maintains audit trails to establish which user or process updated any particular facts, algorithms, or trust factors.

User Interface process 355 is, as the name implies, used to provide a user interface to Information Consumer 360 in order to retrieve facts and trust metadata from Trust Index Repository 320. The user interface includes a capability to "drill down" into a trust factor so that the information consumer can better understand the underlying data and trust metadata to, for example, generate a particular composite trust factor score.

As shown in FIG. 3, the Trust Index Functionality and Trust Index Repository, together provide a solution for a consumer of business information that measures the trust in the requested information. Together, the Trust Index Functionality and the Trust Index Repository provide a Trust Index Framework. A consumer of information can be a user or an application that requests the information for their specific needs. The solution includes the Trust Index Functionality that provides common functionality for all users and allows for customization for specific needs such as unique measurements of trust for specific consumers. The Trust Index Functionality provides the following key capabilities: (1) Definition and configuration of trust factors: define what type of measures—called trust factors—are relevant for the specific consumer (e.g. missing values, currency of data, etc.). Some examples of trust factors are data quality assessments, security aspects, governance related information, system availability, etc. The trust index can be associated with the provenance (also referred to as information lineage) of the information (i.e. who, what, how, when, where the information is being collected and processed from the very beginning). In many cases, trust index can also be associated with the resolution/precision of the information (especially spatial and spatiotemporal information such as satellite images, maps, etc. The trust index can be either absolute, where the trust index is determined in a usage independent way, or relative, where the trust index is normalized with respect to the expected application. Trust factors are grouped into a trust index which is related to a scope of information that can be defined on different levels of granularity, e.g. all the data in a system, a certain domain defined on the metadata or instance level, etc.). A framework can include a set of trust indexes. (2) Definition, configuration, and collection of facts: determine what input data—called facts—are needed to calculate the trust factors (e.g. data quality analysis result/report, etc.), possibly adjust existing definitions and specify how to collect them (e.g. from existing metadata repositories, etc.). The facts may also include the possible usage and/or application of the information. The specification of how the information will be consumed is important in determining the relative trust index. (3) Specify and configure the calculation of trust factors: specify how to derive the trust factor scores from the facts (i.e. the algorithm). The calculation of the trust index could be iterative and take into account of the discrepancy discovered at the consuming side of the trust index to facilitate bootstrapping. (4) Define and configure thresholds of a score for a trust factor: create and customize thresholds for a score of a particular trust factor. Different trust factors can have different thresholds, e.g. an administrator may determine that a score of 70 for the duplicate indicator may be "yellow" vs. a score of 70 for security might be "red." In one embodiment, classification for scores are the three categories acceptable (green), warning (yellow), and alarming/insufficient (red). (5) Specify and configure the aggregation of trust factors into composite trust scores: possibly how to aggregate (atomic) trust factors into composite trust factors. (6) Setup and configuration of the trust score delivery: specify how to deliver the trust scores in an overall solution. As shown, the collection of trust metadata and the calculation of trust factor scores is an iterative process where the selection of trust factor, their calculation and their usage can be extended and refined over time. The framework provides an initial configuration of candidate trust factors and their calculation that are considered common for multiple information consumers. They can be selected and refined in the process described herein.

Figure 4:
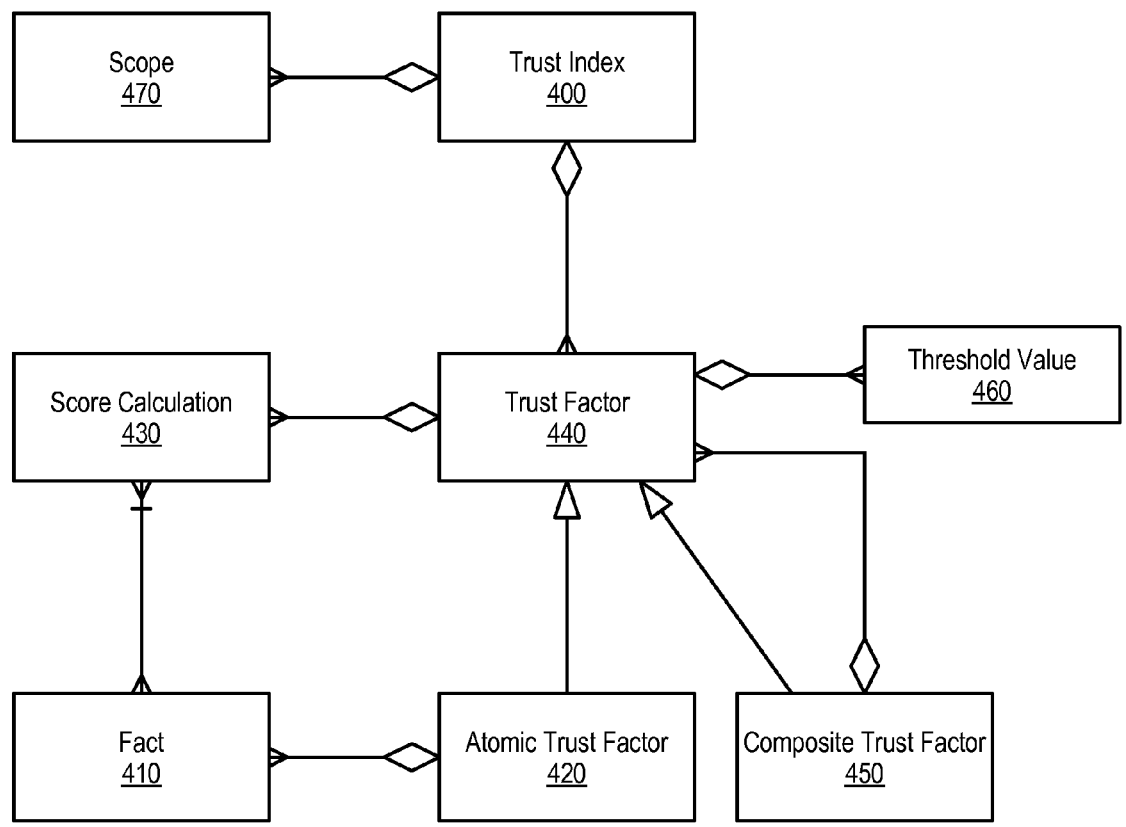
FIG. 4 is a data diagram showing relationships between various data entities included in the trust index repository.

FIG. 4 is a data diagram showing relationships between various data entities included in the trust index repository. Trust Index 400 is the root object that collects all the information related to one instance. There could be multiple Trust Index instantiations, e.g., one for an executive dashboard reporting inventory data and another for an information service that returns customer address information. Over time, those two instantiations of the Trust Index can be merged or kept separate, depending on whether they start to overlap and should be integrated or not. Scope object 470 defines the scope of a Trust Index, such as customer address data.

Trust Factor 440 represents the measurement of trust in the information that is identified in the scope. In one embodiment, the level of trust is measured by a score in a scale from 0 (for the lowest level of trust) to 100 (for the highest level of trust). Threshold Value 460 defines configurable boundaries to specify for each trust factor which part of the scale is related to a more coarse-grained scale such as the typical green-yellow-red. In one embodiment, to classify a score as green means that the level of trust in the associated information meets the requirements of the consumer. The threshold is determined by the consumer, i.e. the consumer specifies the boundaries of the thresholds for each score. For example, if the availability of data is 99.97% and the requirement was >99.9% availability, then the trust score for information availability would be green. If the score is classified as yellow, then information should be consumed with care. Even though it doesn't meet the defined requirements, it may be still "good enough" to be consumed. For example, the completeness of information may not be 99% as required due to data load exceptions but higher than 90%. A classification of a score as red means that the information cannot be trusted.

As described above, trust factors can be aggregated. This is represented in the model above in the two subtypes Atomic Trust Factor 420 and Composite Trust Factor 450. The score of Composite Trust Factor 450 is calculated based on its related set of trust factors (Trust Factor 440). The score of Atomic Trust Factor 460 is calculated from facts 410.

Score Calculation object 430 provides algorithms to calculate scores from underlying facts or other factors. The set of algorithms can be modified and extended depending on the requirements of specific projects.

Fact object 410 represents the input data to calculate the score of atomic trust factors (Atomic Trust Factor 420). It is populated from the databases of information providers and other (meta-)data repositories. The definition of trust factors determines the related input data, which are the facts for atomic trust factors or other trust factors for composite trust factors. The definition of the facts then determines the sources—such as a metadata repository—and the algorithm for collecting the fact data from the source and possibly transforming it so that it can be populated into the fact object.

Figure 5:
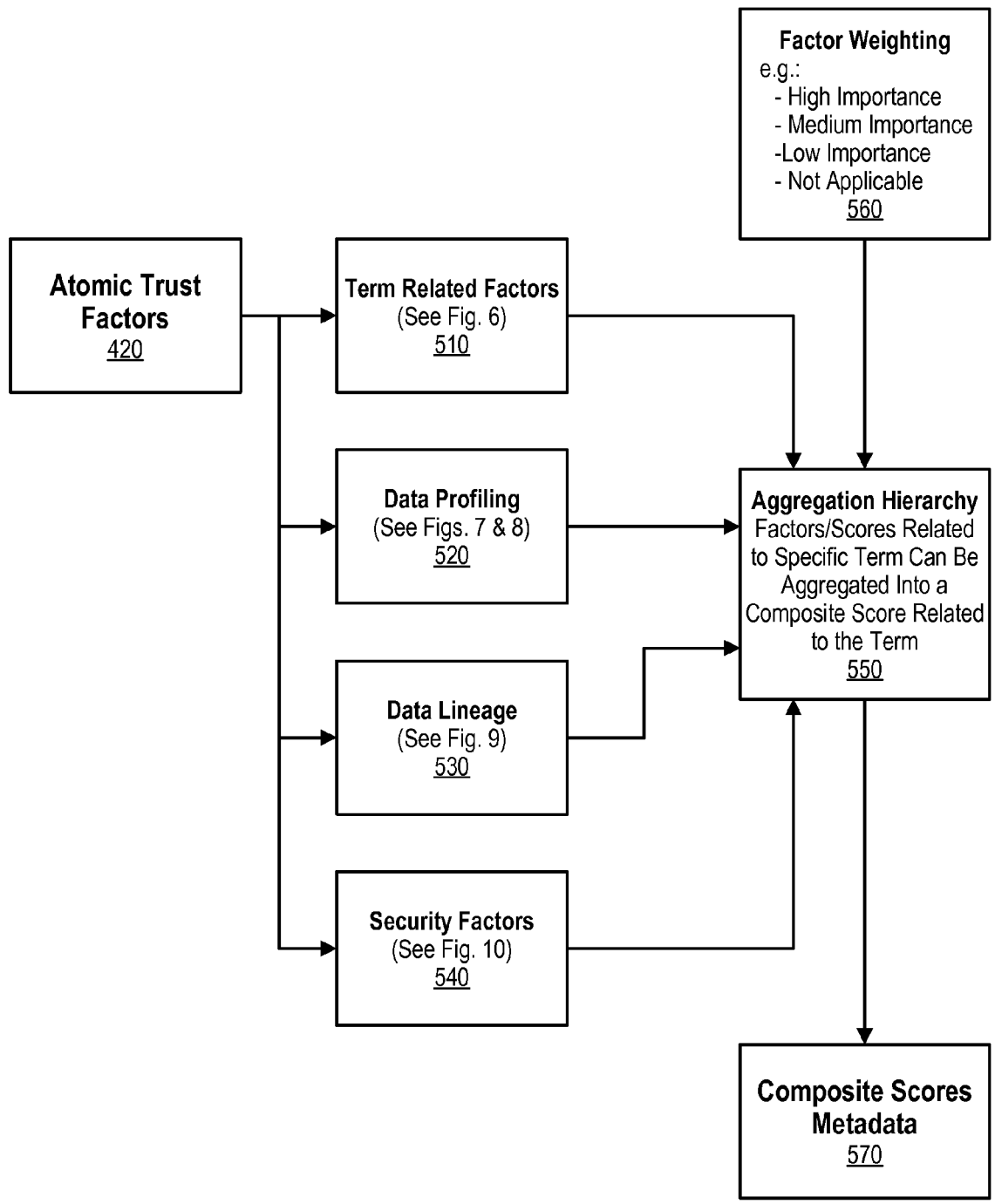
FIG. 5 is a data diagram showing various factors included in atomic trust factors and a high-level depiction of how factors are aggregated.

FIG. 5 is a data diagram showing various factors included in atomic trust factors and a high-level depiction of how factors are aggregated. Atomic trust factors 420 are broken down into various groups of atomic trust factors. These groups include term related atomic trust factors 510 (see FIG. 6 and corresponding text for details of specific term related atomic trust factors). Another group of atomic trust factors is data profiling factors 520 (see FIGS. 7-8 and corresponding text for details of data profiling factors). An additional group of atomic trust factors is data lineage trust factors 530 (see FIG. 9 and corresponding text for details of data lineage trust factors). A further group of atomic trust factors is security factors 540 (see FIG. 10 and corresponding text for details of security factors).

Atomic trust scores can also be directly used by the information consumer or can be further processed by aggregation hierarchy process 550 to generate composite trust scores. The various atomic trust factors (factors 510 to 540) are fed into aggregation hierarchy process 550 which generates composite scores using one or more of the atomic trust factors as inputs (e.g., term related factors, data profiling factors, data lineage factors, and security factors, etc.). In addition, weighting factors 560 can be applied to the composite factor and/or one or more of the underlying atomic trust factors. For example, when an organization is initially running aggregation process 550, a weighting factor might be applied so that if a particular atomic factor is not resolved or is resolved poorly, the factor is still used in the aggregation hierarchy. One example could be multiplying a particular atomic trust factor by a weighting factor so that the lack of reliability (trust) in the atomic trust factor does not overly reduce the resulting composite score 570. However, when the data is more settled, this weighting factor can be changed in order to highlight the issue regarding the particular atomic trust factor so that the underlying trustworthiness of the data is addressed.

One embodiment for using weighting factors 560 is using a weight default configuration. Coarse- or fine-grained weighting can be applied. An example of course-grained weighting, would be "high" (H), "medium" (M), "low" (L), and not applicable (N/A) with corresponding fine-grained weighting being 7 to 9 for "high," 4 to 6 for "medium," 1 to 3 for "low," and 0 for "not applicable." A high weighting for a trust factor would imply that the associated trust factor (and its score) are of highest importance in the project. In one embodiment, the default mapping of the coarse grained weight 'high' maps to the fine-grained weight '8'. A medium weighting for a trust factor would imply that the associated trust factor (and its score) are of medium importance in the project, while a low weighting for a trust factor would imply that the associated trust factor (and its score) are of least importance in the project. A weighing of "not applicable" (N/A or '0') implies that the trust factor (and the associated score) do not apply to the specific project.

The result of aggregation hierarchy process 550 is one or more composite and/or atomic trust scores 570. As shown, one or more composite trust scores can be used as inputs to aggregation hierarchy process 550 to create additional levels of composite trust scores. A composite score is calculated from a set of elementary scores. The elementary scores can either be atomic, i.e. calculated from facts, or they can be composite scores themselves. Weights can be specified for scores which can be used by algorithms to calculate composite scores. In one embodiment, defining composite scores in a multi level hierarchy follows a logical grouping of trust factors. For example, some trust factors might be related to a column of a table in a database. Those trust factors could be aggregated into a single column score for a particular column. All the column scores for a particular table could then be aggregated into a table score for that table. And then all the table scores of a database could be aggregated into the score for the database.

One type of an aggregate score is a "weighted average" score:

Description: Calculates an aggregate score based on the average that considers the weight (priority) of the elementary trust scores.

Parameters: $y_{WA}$ composite score based on the weighted average $ES_i$ one elementary score (indicated by the index i; i=1 ... n)

$WES_i$ weight for a particular elementary score $ES_i$

Algorithm: $y_{WA}=(\Sigma_{i=1 \ldots n}(ES_i \times WES_i))/(\Sigma_{i=1 \ldots n} WES_i)$ Another type aggregate score is a Minimum Score for High Priority Elementary Factors where:

Description: This algorithm returns the minimum score of any high priority elementary factor if it is lower than the weighted average of the elementary scores. Otherwise, it returns the weighted average of the elementary scores.

Parameters: $y_{MS}$ composite score based on the minimum score for high priority elem. factors $y_{WA}$ composite score based on the weighted average $ES_i$ one elementary score (indicated by the index i; i=1 ... n)

$WES_i$ weight for a particular elementary score $ES_i$

WT threshold to distinguish high priority elementary scores (see below) from all other, non-high priority scores.

$HPES_j$ high priority elementary score, i.e. where $WES_i>WT$; j=1 ... k

Algorithm: $y_{MS}=MIN (MIN_{i=1 \ldots k}(HPES_j), y_{WA})$

Figure 6:
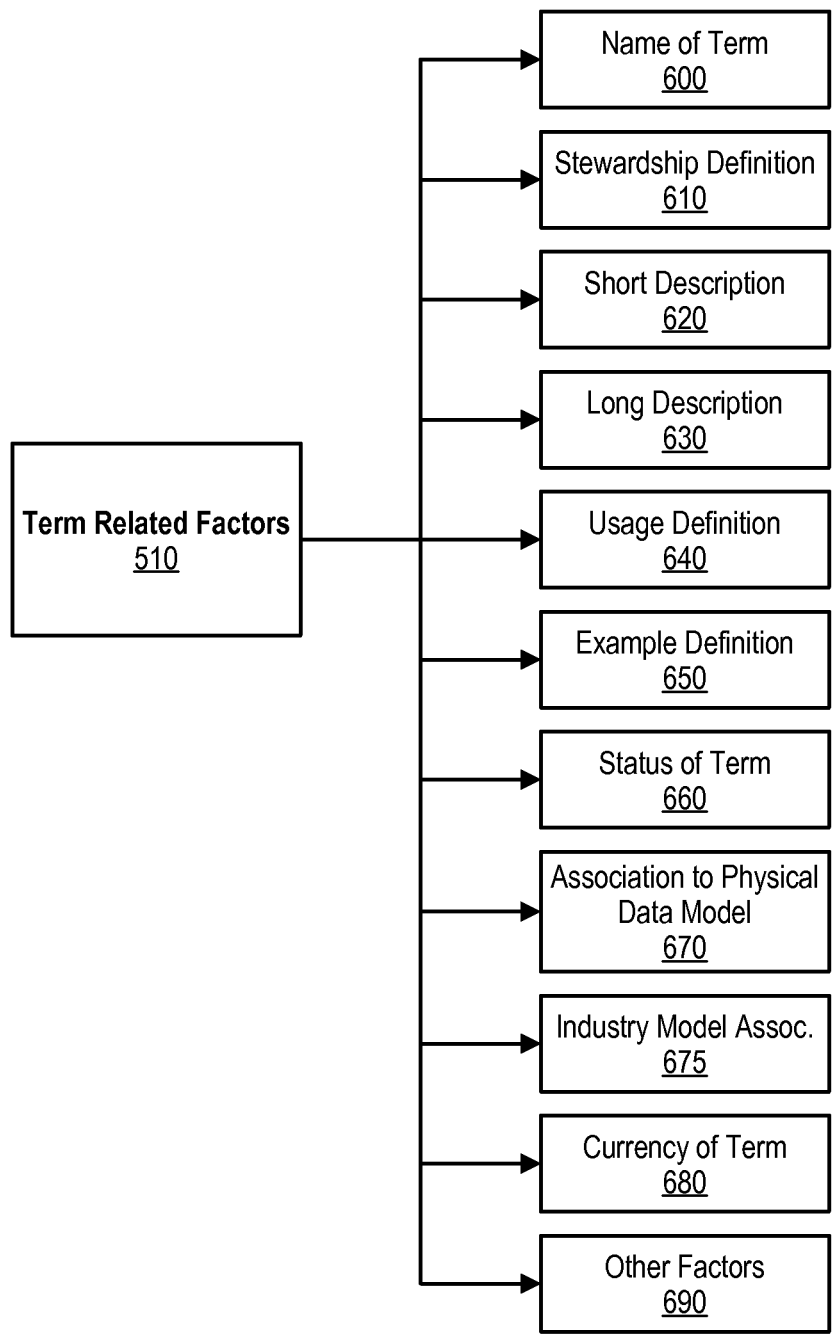
FIG. 6 is a data diagram showing factors included in term related trust factors.

FIG. 6 is a data diagram showing factors included in term related trust factors. An example set of term related trust factors is shown along with a description of each example factor, facts regarding the term, an example algorithm that could be used for the term related trust factor, example thresholds, and an example priority.

Name of Term (600)
Description: Indicates if a name is defined for a term—and therefore if a term is defined at all—that is associated with the trust object
Facts: NA: name field
Algorithm: if (NA==NULL) score=0; else score=100;
Threshold: green=100;
 red=0;
Priority: High
 Stewardship Definition for Term (610)
Description: Indicates if a steward is defined for a term that is associate with the scope
Facts: ST: steward field
Algorithm: score=if (ST==NULL) score=0; else score=100;
Threshold: green=100;
 red=0;
Priority: High
 Short Description of Term (620)
Description: Indicates if a short description is defined for a term that is associate with the scope
Facts: SD: short description field
Algorithm: if (SD==NULL) score=0; else score=100;
Threshold: green=100;
 red=0;
Priority: Medium
 Long Description of Term (630)
Description: Indicates if a long description is defined for a term that is associate with the scope. The score can be calculated as a coarse grained result—i.e. does the long description exist or not (see Algorithm 1)—ore more fine grained that reflects how long the long description is (see Algorithm 2).
Facts: LD: short description field
 EL: expected length for highest score
Algorithm 1: if (LD==NULL) score=0; else score=100;
Threshold 1: green=100;
 red=0;
Algorithm 2: if (LENGTH(LD)>EL) score=100;
 else score=LENGTH(LD)/EL*100;
Threshold2: green=100–36;
 yellow=35–6
 red=5–0;
Priority: Low
 Usage Definition of Term (640)
Description: Indicates if any usage is defined for a term that is associate with the scope
Facts: USG: example field
Algorithm: if (USG==NULL) score=0; else score=100;
Threshold: green=100;
 red=0;
Priority: Medium
 Example Definition for Term (650)
Description: Indicates if an example is defined for a term that is associate with the scope
Facts: EX: example field
Algorithm: if (SD==NULL) score=0; else score=100;
Threshold: green=100;
 red=0;
Priority: Low
 Status of Term (660)
Description: Indicates what the status of the term is that is associate with the scope.
Facts: ST: status field with the following values:
 'Candidate': the default value for new terms;
 'Accepted': accepted by an administrator for general use.
 'Standard': considered the standard for definitions of its type.
 'Deprecated': should no longer be used.
Algorithm: if (ST=='Deprecated') score=0;
 else if (ST=='Candidate') score=50;
 else if (ST=='Accepted') score=80;
 else if (ST=='Standard') score=100;
Threshold: green=100–51
 yellow=50
 red=0;
Priority: High
 Association to Physical Data Model (670)
Description: Reflects if the term is associated to any element of a physical (or logical) data model.
Facts: ADME: number of associated data model elements
Algorithm: if (ADME>0) score=100; else score=0;
Threshold: green=;
 yellow=;
 red=;
Priority: High
 Industry Model Association of Term (675)
Description: Indicates that the definition of the term is aligned with the industry models.

Figure 7:
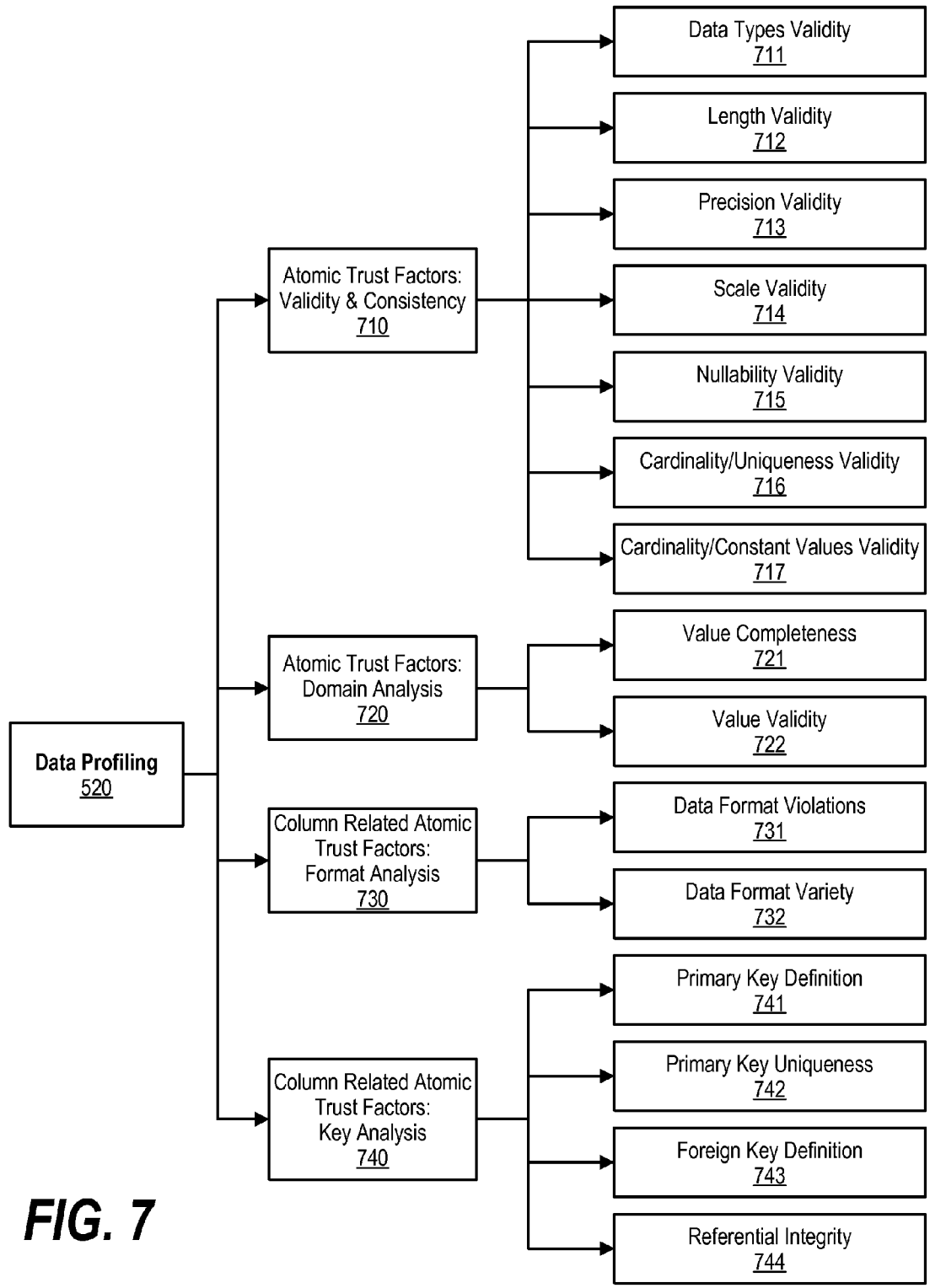
FIG. 7 is a data diagram showing factors included in data profiling trust factors.

Facts: IMA: flag to indicate if the term is aligned/associated with the Industry Models
Algorithm: if (SD==NULL) score=0; else score=100;
Threshold: green=100;
red=0;
Priority: Medium
Currency of a Term (680)
Description: Indicates how current the information related to a term is
Facts: TDLU: date of last update for the term
Priority: Medium/Low
Other Factors (690)—other term related trust factors that can be defined as needed by the organization.
FIG. 7 is a data diagram showing factors included in data profiling trust factors. Data profiling trust factors are shown broken into some atomic data profiling trust factors and some column related atomic trust factors. Within atomic data profiling trust factors, validity and consistency trust factors 710 are shown with seven examples of validity and consistency trust factors (711 to 717). Validity and consistency trust factor examples are shown below along with descriptions, constraints, facts, algorithms, thresholds, and priorities:

Date Types Validity (711):
Description: Indicates the confidence in the validity of the defined data type of a column based on the inferred data types from the column analysis.
Constraints: Applies to columns that have been analyzed.
Facts: $x_{DefDataType}$: defined data type as specified in the source and based on metadata import;
$x_{SetInfDataType}$: set of inferred data types as derived in the column analysis;
$x_{IntersctDefInf}$: intersection of the set of inferred data types and defined data types;
$x_{NumInfDataType}$: number of inferred data types;
Location: xMeta
$x_{DefDataType}$: ColumnProperties.DataTypeChosen
$x_{SetInfDataType}$: ColumnDataTypeSummary.DataType
Algorithm: if ($x_{DefDataType} \in x_{SetInfDataType}$) score=100;
else if ($x_{IntersctDefInf}$==0) score=0;
else score=100/POWER(2, $x_{NumInfDataType}$);
Priority: Medium/High Length Validity (712):
Description: Indicates if the confidence in the validity of the defined length of a column based on various characteristics such as inferred, minimum, maximum length etc (see facts).
Constraints: Applies to columns of type CHAR, DECIMAL.
Facts: $x_{DefLength}$: defined length of the column;
$x_{InfLength}$: inferred length of the column;
$x_{MinLength}$: minimum length for the column;
$x_{MaxLength}$: maximum length for the column;
$x_{DeltaMax}$=ABS($x_{DefLength}-x_{MaxLength}$): delta between defined and maximum length;
$x_{DeltaMin}$=ABS($x_{DefLength}-x_{MinLength}$): delta between defined and minimum length;
$x_{AvgLength}$: average length for the column;
$x_{StdDev}$: standard deviation for the column length;
Location: xMeta
$x_{DefLength}$: ColumnProperties.LengthChosen
$x_{InfLength}$: ColumnProperties.LengthInferred
$x_{MinLength}$: DataField.maximumLength
$x_{MaxLength}$: DataField.minimumLength
Algorithm: if ($x_{InfLength}$==$x_{DefLength}$) score=100;
else if ($x_{DefLength}<=x_{MaxLength}$) && ($x_{DefLength}>=x_{MinLength}$) score=95;
else if ($x_{DefLength}>x_{MaxLength}$) score=MIN(90,LOGn(($x_{DeltaMax}$+1)/$x_{DeltaMax}$,1.001);
else score=MIN(90,LOGn(($x_{DeltaMin}$+1)/$x_{DeltaMin}$,1.001);
Comment: Same algorithm as for precision and scale validity (see below)
Priority: Low/Medium;

Precision Validity (713):
Description: Indicates if the confidence in the validity of the defined precision of a column based on various characteristics such as inferred, minimum, maximum precision etc (see facts).
Constraints: Applies to columns of data type NUMERIC
Facts: $x_{DP}$: defined precision of the column;
$x_{IP}$: inferred precision of the column;
$x_{MIN}$: minimum precision for the column;
$x_{MAX}$: maximum precision for the column;
$x_{AVG}$: average precision for the column;
$x_{SD}$: standard deviation for the precision;
Location: xMeta
$x_{DP}$: ColumnProperties.PrecisionChosen
$x_{IP}$p: ColumnProperties.PrecisionInferred
$x_{MIN}$: ColumnAnalysisResults.PrecisionMin
$x_{MAX}$: ColumnAnalysisResults.PrecisionMax
Algorithm: if ($x_{IP}$==$x_{DP}$) score=100;
else if ($x_{DP}<=x_{MAX}$) && ($x_{DP}>=x_{MIN}$) score=95;
else if ($x_{DP}>x_{MAX}$) score=MAX(90, LOGn((|$x_{DP}-x_{MAX}$|+1)/|$x_{DP}-x_{MAX}$|,1.001);
else score=MAX(90, LOGn((|$x_{DP}-x_{MIN}$|+1)/|$x_{DP}-x_{MIN}$|, 1.001);
Comment: Same algorithm as for length and scale validity Scale Validity (714):
Description: Indicates if the confidence in the validity of the defined scale of a column based on various characteristics such as inferred, minimum, maximum scale etc (see facts).
Constraints: Applies to columns for which the data type has a decimal point.
Facts: $x_{DS}$: defined scale of the column;
$x_{IS}$: inferred scale of the column;
$x_{MIN}$: minimum scale for the column;
$x_{MAX}$: maximum scale for the column;
$x_{AVG}$: average scale for the column;
$x_{SD}$: standard deviation for the scale;
Location: xMeta
$x_{DS}$: ColumnProperties.ScaleChosen
$x_{IS}$: ColumnProperties.ScaleInferred
$x_{MIN}$: ColumnAnalysisResults.ScaleMin
$x_{MAX}$: ColumnAnalysisResults.ScaleMax
Algorithm: if ($x_{IS}$==$x_{DS}$) score=100;
else if ($x_{DS}<=x_{MAX}$)||($x_{DS}>=x_{MIN}$) score=95;
else if ($x_{DS}>x_{MAX}$) score=MAX(90, LOGn((|$x_{DS}-x_{MAX}$|+1)/|$x_{DS}-x_{MAX}$|,1.001);
else score=MAX(90, LOGn((|$x_{DS}-x_{MIN}$|+1)/|$x_{DS}-x_{MIN}$|, 1.001);
Comment: Same algorithm as for length and precision validity Nullability Validity (715):
Description: Indicates if the inferred characteristics regarding null values in the column match the definition
Facts: $x_{Threshold}$: If the percentage of null values in a column is equal to or greater than the system-defined threshold, the null property is inferred. The system-defined threshold is a setting that you can modify to allow a specific amount of data variances
$x_{NumRows}$: number of rows in the column;
$x_{NumNull}$: number of null values in the column;
$x_{NullPerctg}$: percentage of null values in the column
Location: xMeta
$x_{Threshold}$: AnalysisOptions.nullabilityThreshold
$x_{NumRows}$: DCAnalysisSummary.rowCount $x_{NumNull}$: DataField.numberNullValues
$x_{NullPerctg}$: ColumnProperties.NullabilityPercent
Algorithm: if ($x_{NullPerctg}<=x_{Threshold}$)) score=100;
  else  score=100−($x_{NullPerctg}-x_{Threshold}$)/($x_{NumRows}*(1-x_{Threshold}$))*100;
Priority: high
  Cardinality/Uniqueness Validity (716):
Description: Indicates if the inferred characteristics regarding uniqueness in the column match the definition
Facts: $x_{DefUnique}$: defined uniqueness of the column;
  $x_{Threshold}$: If the percentage of unique values in a column is equal to or greater than the system-defined threshold, the uniqueness property is inferred;
  $x_{NumRows}$: number of rows in the column;
  $x_{NumUnique}$: number of unique values in the column;
Location: xMeta
  $x_{DefUnique}$: DataField.isUnique
  $x_{Threshold}$: AnalysisOptions.uniquenessThreshold
  $x_{NumRows}$: DCAnalysisSummary.rowCount
  $x_{NumUnique}$: ColumnAnalysisResults.TotalDataValuesUnique
Algorithm: if ($x_{DefUnique}$=='No')||(($x_{DefUnique}$=='Yes') && ($x_{NumUnique}>=x_{Threshold}$))
  score=100;
  else  score=100−($x_{NumUnique}-x_{Threshold}$)/($x_{NumRows}-x_{Threshold}$)*100;
Comment: similar algorithm to nullability validity
  Cardinality/Constant Values Validity (717):
Description: Indicates if the inferred characteristics regarding constant values in the column match the definition
Facts: $x_{DefConst}$: defined constant values of the column;
  $x_{Threshold}$: If the percentage of unique values in a column is equal to or greater than the system-defined threshold, the uniqueness property is inferred;
  $x_{InfConstant}$: inferred definition for cardinality/uniqueness;
  $x_{NumConstant}$: number of unique values in the column;
Location: xMeta
  $x_{Threshold}$: AnalysisOptions.constantThreshold
Algorithm: if ($x_{DefConst}$=='No')||(($x_{DefConst}$=='Yes') && ($x_{NumConstant}>=x_{Threshold}$))
  score=100;
  else  score=100−($x_{NumConstant}-x_{Threshold}$)/($x_{NumRows}-x_{Threshold}$)*100;
Comment: similar algorithm to nullability validity
Priority: medium
  Also within atomic data profiling trust factors are domain analysis trust factors 720. Domain analysis trust factors 720 are shown with two examples (721 and 722). Domain analysis trust factors examples are shown below along with various descriptions, constraints, facts, algorithms, and priorities:
  Value Completeness (721):
Description: Indicates the percentage of rows that had incomplete values as determined by the column analysis (domain & completeness section)
Constraints: Only applies if incomplete values are defined.
Facts: $x_{NumIncompl}$: number of incomplete records as determined in column analysis;
  $x_{NumRow}$: number of rows in the column;
Location: xMeta
  $x_{NumIncompl}$: DFAnalysisSummary.numberValues−DFAnalysisSummary.numberCompleteValues
  $x_{NumRow}$: DCAnalysisSummary.rowCount
Algorithm: score=100−($x_{NumIncompl}/x_{NumRow}$)*100;
  Value Validity (722):
Description: Indicates how many invalid values have been identified as part of the column analysis (domain & completeness section)

Figure 8:
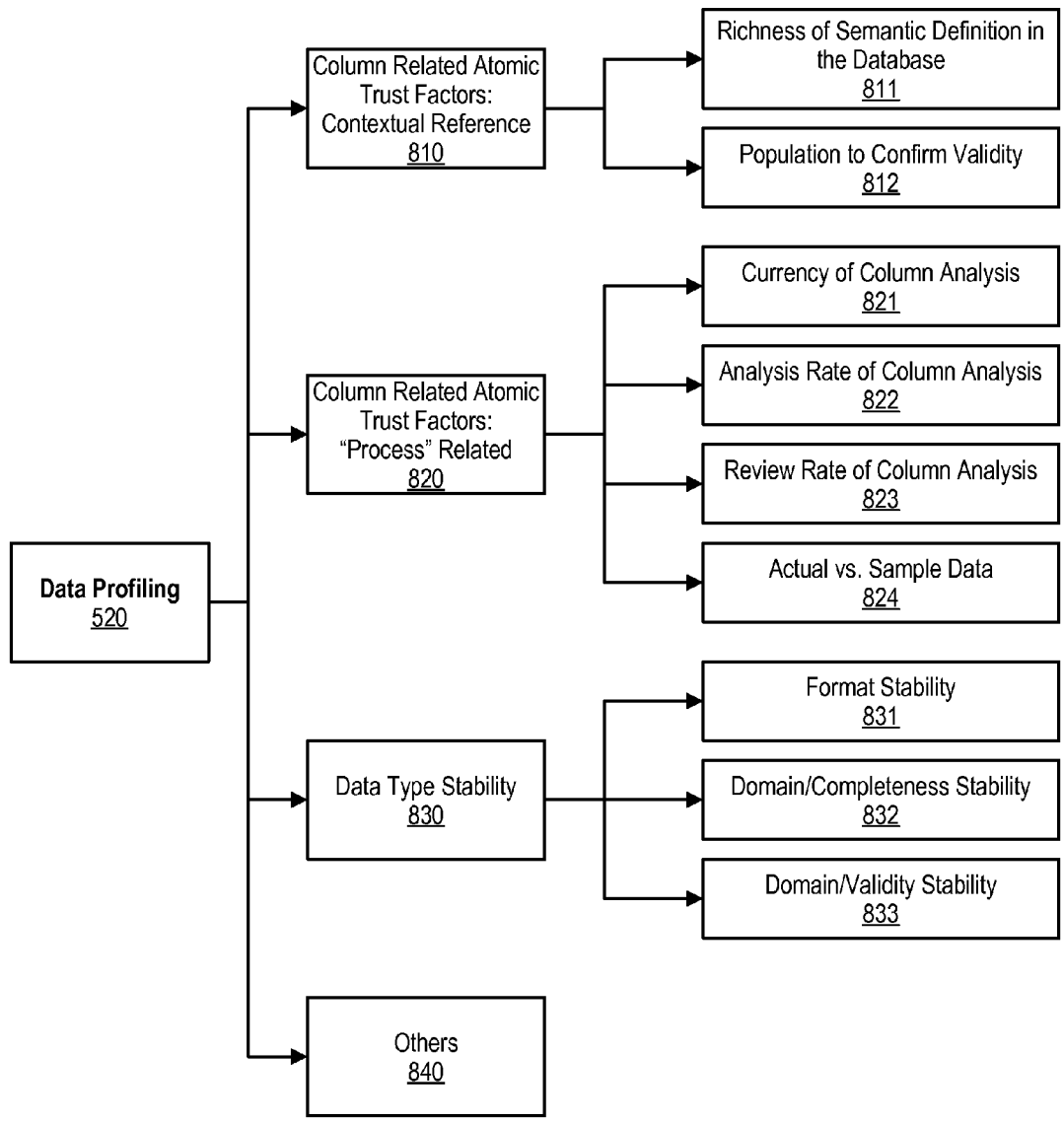
FIG. 8 is a data diagram showing additional factors included in data profiling trust factors.

Constraints: Only applies if invalid values are defined.
Facts: $x_{NumInvRec}$: number of invalid values as defined above and as calculated by column analysis by the users;
  $x_{NumRow}$: number of rows in the column;
Location: xMeta
  $x_{NumInvRec}$: DFAnalysisSummary.numberValues−DFAnalysisSummary.numberValidValues
  $x_{NumRow}$: DCAnalysisSummary.rowCount
Algorithm: score=100−($x_{NumInvRec}/x_{NumRow}$)*100;
Priority: High
  One of the column-related atomic trust factors that falls within atomic data profiling trust factors are format analysis trust factors 730.
  Column-based trust factors are atomic and related to a physical column in a data store, such as a database. Format analysis trust factors 730 are shown with two examples (731 and 732). Format analysis trust factor examples are shown below along with various descriptions, constraints, facts, algorithms, and priorities:
  Data Format Violations (731):
Description: Indicates how many data format violations have been specified Constraints: Only applies if format violations are identified.
Facts: $x_{NumFormatViolations}$: number of format violations;
  $x_{NumFormats}$: number of identified formats;
  $x_{ViolPerctg}=(x_{NumFormats}-x_{NumFormatViolations})/x_{NumFormats}*100$: percentage of violations
Location: xMeta
Algorithm: score=LOGn(($x_{ViolPerctg}+1)/x_{ViolPerctg}$,1.001);
  Data Format Variety (732):
Description: Indicates how many data formats have been identified in the particular column
Facts: $x_{NumDistinctFormat}$: number of distinct formats as identified in the column analysis
Location: xMeta
  $x_{NumDistinctFormat}$: DFAnalysisSummary.numberFormats
Algorithm: score=100−50*(MIN(3,$x_{NumDistinctFormat}$)−1)
  Another set of column-related atomic trust factors that falls within atomic data profiling trust factors are key analysis trust factors 740. Key analysis trust factors 740 are related to database keys and are shown with four examples (741 to 744). Key analysis trust factor examples are shown below along with various descriptions, facts, and algorithms:
  Primary Key Definition (741):
Description: Indicates if a primary key has been defined and if it matches the inferred primary key
Facts: PKD: set of primary keys as defined in the data model;
  PKI: set of inferred primary keys as derived by Information Analyzer;
  NPKD=|PKD|: number of primary keys defined;
  NPKI=|PKI|: number of primary keys inferred;
Location: xMeta—
Algorithm: if (PKD==PKI) score=100;
  else if (NPKD>0) score=50;
  else if (NPKI>0) score=25
  else 0;
  Primary Key Uniqueness (742):
Description: Indicates if duplicate exists for primary key values
Facts: $x_{NumDupl}$: number of duplicate values in the (primary key) column;
  $x_{NumRows}$: number of rows;
  $x_{DuplPerctg}=x_{NumDupl}/x_{NumRows}$: number of duplicates per number of rows
Location: xMeta
Algorithm 1: score=MAX (0,100−10*$x_{DuplPerctg}$*100);
Algorithm 2 score=$x_{NumRows}/(x_{NumDupl}+1)$ Foreign Key Definition (743):
Description: Indicates if a foreign key has been defined and if it matches the inferred foreign key
Facts: $x_{DefFK}$: set of foreign keys as defined in the data model;
  $x_{InfFK}$: set of inferred foreign keys as derived by Information Analyzer;
  $x_{NumDefFK}$: number of foreign keys defined;
  $x_{NumInfFK}$: number of foreign keys inferred;
Location: xMeta—
Algorithm: if ($x_{DefFK}=x_{InfFK}$) score=100;
  else if ($x_{NumDefFK}>0$) score=50;
  else if ($x_{NumInfFK}>0$) score=25
  else 0;
Referential Integrity (744):
Description: Indicates if orphans exists, i.e. a value exists in a foreign-key column but it does not have a corresponding value in the related primary-key column
Facts: $x_{NumOrph}$: number of orphans for a foreign key column;
  $x_{NumRows}$: number of rows in the foreign key column;
  $x_{OrphPerctg}=x_{NumOrph}/x_{NumRows}$: number of orphans per number of rows;
Algorithm 1: score=MAX(0,10*$x_{OrphPerctg}$*100))
Algorithm 2: score=$x_{NumRows}/(x_{NumOrph}+1)$ FIG. 8 is a data diagram showing additional factors included in additional data profiling trust factors. Two additional column-related trust factors are shown (contextual reference trust factors 810 and process related trust factors 820). In addition, data stability trust factors 830 are shown along with any other data profiling trust factors 840 needed by the organization.

The next set of column-related atomic trust factors that falls within atomic data profiling trust factors are contextual reference trust factors 810. Contextual reference trust factor examples are shown below along with various descriptions, constraints, facts, examples, and algorithms:
  Richness of Semantic Definition in the Database (811):
Description: Indicates how well defined the columns are.
Example: A customer used only 5 characters for all column names and 4 character for all table names which made the understanding and analysis of the data very difficult.
Comment: This is very closely related to the business glossary category and should be aligned/combined in a cross-domain hierarchy
  Population to Confirm Validity (812):
Description: Indicates if there are enough values available for a column in order to confirm the meaning and the validity of the column in general
Facts: NN: number of rows with NULL values from a Column Analysis;
  NR: number of rows;
  NP=NN/NR: null value percentage;
Location: xMeta—
Algorithm1: score=100−NP*100;
Algorithm2: if (NP>0.09) score=90+NP*10;
  else score=NP*1000;

The next set of column-related atomic trust factors that falls within atomic data profiling trust factors are process related trust factors 820. Process related trust factor examples are shown below along with various descriptions, constraints, facts, examples, and algorithms:
  Currency of Column Analysis (821):
Description: Indicates how recent the quality analysis was performed
Facts: LUCA: last updated date for column analysis
  TODAY: today's date
  DD=TODAY−LUCA: difference in days between TODAY and LUCA Location: xMeta
  LUCA: TableAnalysisMaster.publicationDate
Algorithm1: score=100−((DD−10)/(10−log2(DD)))
Algorithm2: if (DD<10) score=100−DD/10;
  else if (dd>=10 && <99) score=100−DD;
  else score=0;
Threshold: green =;
yellow=;
red=;
Priority: Medium/High
  Analysis Rate of Column Analysis (822):
Description: Indicates how much of the data in scope has been analyzed by column analysis
Facts: A: percentage of data being analyzed in column analysis
Location: xMeta
Algorithm: score=A;
Priority: Medium/High
  Review Rate of Column Analysis (823):
Description: Indicates how much of the analyzed data (by column analysis) has been reviewed
Facts: R
Location: xMeta
Algorithm: score=R;
  Actual vs. Sample Data (824):
Description: Indicates if the analyzed data was the actual data itself or sampled data
Facts: SD: flag to indicate if the data was sample data
Location: xMeta
Algorithm: if (SD) score=100;
  else score=0;
  Data type stability trust factors 830 is another set of atomic trust factors that falls within atomic data profiling trust factors 520. Three examples of data type stability trust factors are shown below along with various descriptions, facts, and algorithms:
  Format Stability (831):
Description: Indicates how much the format definition has changed between data quality assessment tests.
Facts: $x_{currentFormats}$: set of current distinct formats;
  $x_{priorFormats}$: set of prior distinct formats;
  $x_{formatOverlapSize}=|x_{currentFormats} \cap x_{priorFormats}|$: size of overlap (i.e. number of elements in the overlap set) between current and prior distinct formats;
  $x_{numberCurrentFormats}=|x_{currentFormats}|$: number of current distinct formats;
  $x_{numberPriorFormats}=|x_{priorFormats}|$: number of prior distinct formats;
  $x_{sizeFormatDiff}=x_{numberCurrentFormats}-x_{numberPriorFormats}$: difference between number of current distinct formats and prior distinct formats;
Algorithm: if ($x_{numberCurrentFormats}>x_{numberPriorFormats}$)
  score=($x_{sizeFormatDiff}*x_{formatOverlapSize})/x_{numberCurrentFormats}*100$;
  else score=$x_{formatOverlapSize}/x_{numberCurrentFormats}*100$;
  Domain/Completeness Stability (832):
Description: Indicates how much the domain definition (validity, completeness) has changed between data quality assessment tests.
Facts: $x_{currentIncomplete}$: percentage (0-100) of values in column that are incomplete based on current analysis;
  $x_{priorIncomplete}$: percentage (0-100) of values in column that are incomplete based on prior analysis;
Algorithm: score=100−10*($x_{currentIncomplete}-x_{priorIncomplete}$);

Domain/Validity Stability (833):
Description: Indicates how much the domain definition (validity, completeness) has changed between data quality assessment tests.
Facts: $x_{currentInvalid}$: percentage (0-100) of values in column that are invalid based on current analysis;
$x_{priorInvalid}$: percentage (0-100) of values in column that are invalid based on prior analysis;
Algorithm: score=$100-10*(x_{currentInvalid}-x_{priorInvalid})$;
Other Data Profiling Factors (840)—other data profiling trust factors can be defined as needed by the organization.

Figure 9:
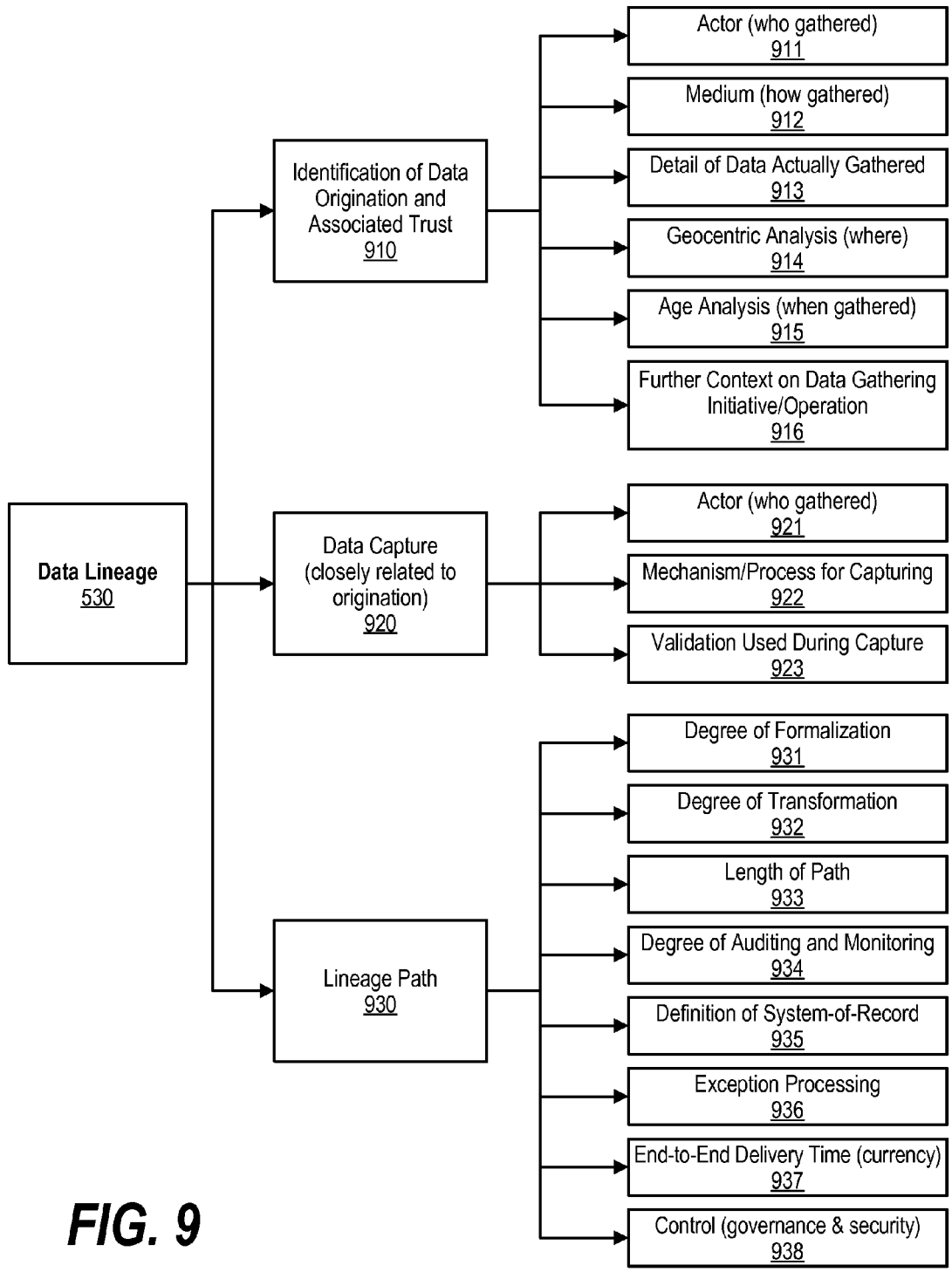
FIG. 9 is a data diagram showing factors included in data lineage trust factors.

FIG. 9 is a data diagram showing factors included in data lineage trust factors. Three subsets of data lineage trust factors are shown: Identification of Data Origination and Associated Trust 910, Data Capture trust factors 920, and Lineage Path trust factors 930. Six examples of trust factors are shown within Identification of Data Origination and Associated Trust 910. These include actor (911)—who provides the data: is it the user or a 3rd party, etc.; medium (912)—is it a manually filled out paper or an online form etc.; detail of the data actually gathered (913); geocentric analysis (914) identifying where the data was gathered, age analysis (915) identifying when the data was gathered, and further context information (916) on the context in which the information has been gathered (e.g. a vendor retrieving a person's phone number from a phone book, etc.).

Three examples are included within Data Capture trust factors 920. These examples include actor (921) identifying who captured/gathered the data, mechanism/process (922) identifying the mechanism or process used to capture the data, validation (923) identifying validation performed during capture (e.g. data entered as provided or also validated against rules, etc.).

Eight examples are included within Lineage Path trust factors 930. These include degree of formalism (931, e.g. undocumented proprietary code vs. formally defined, documented, tested, controlled . . . ETL jobs, etc.); degree of transformation (932, e.g. the more data is transformed, the more likely it is that defects are introduced, etc.); length of path (933, e.g. the longer the path—meaning the number of data stores and linkages between them—the more likely it is that there will be issues, etc.); degree of auditing and monitoring (934); definition of a system-of-record (935); exception processing (936, e.g. what happens to exceptions, etc.); end-to-end delivery time (937, e.g., the currency of information, etc.); and control of the data along the lineage path (938, governance and security of the data, etc. also related to security factors shown in FIG. 10).

Figure 10:
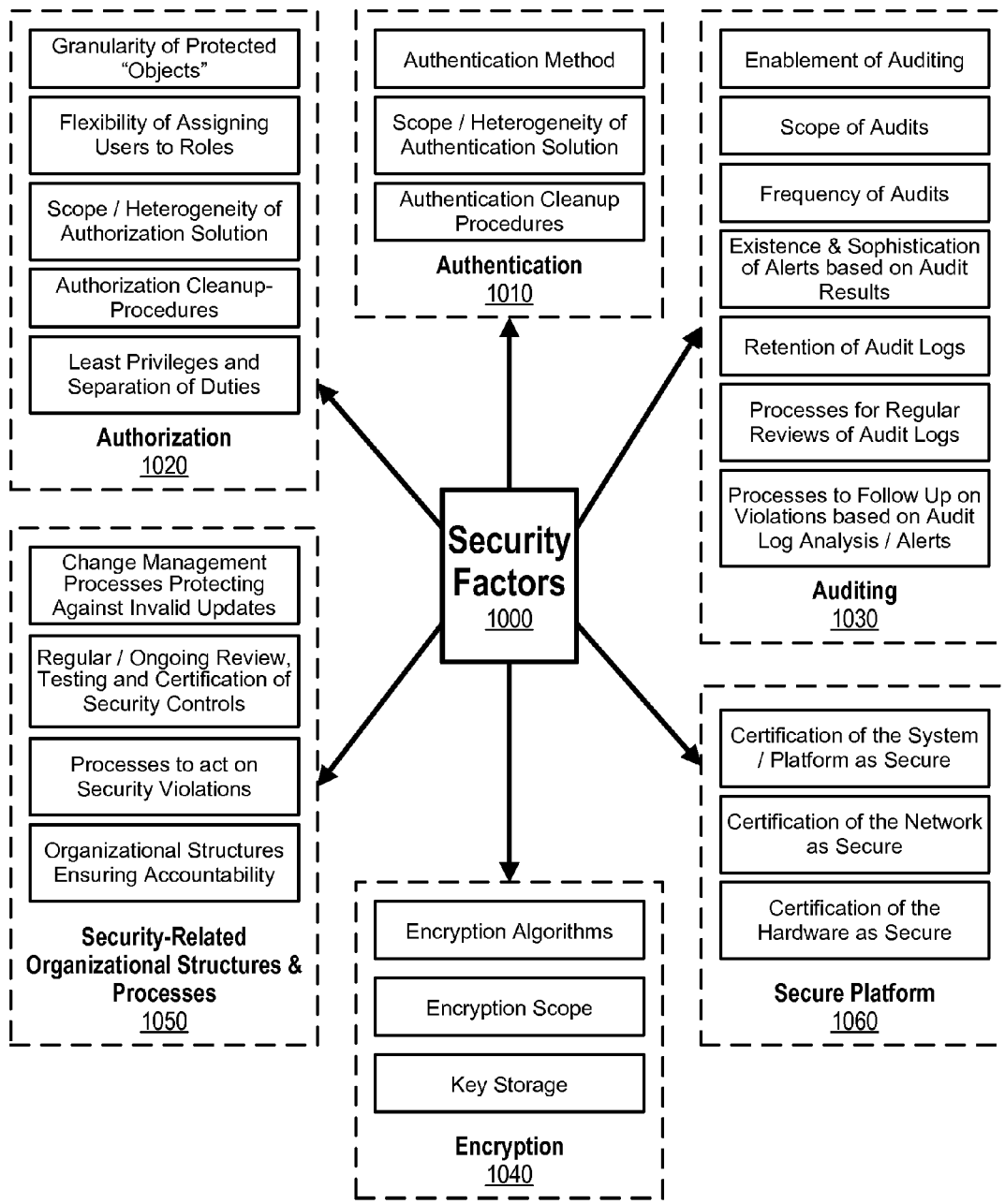
FIG. 10 is a data diagram showing factors included in security trust factors.

FIG. 10 is a data diagram showing factors included in security trust factors. Security factors 1000 are broken down into six types of security factors that include authentication security factors 1010, authorization security factors 1020, auditing security factors 1030, encryption security factors 1040, security related, organizational structures and process security factors 1050, and security platform factors 1060. Within each of these types of security factors, a number of example security factors are provided to provide context and detail for the type of security factor. Within authentication security factors 1010 is Authentication Method, Scope/Heterogeneity of Authentication Solution, and Authentication Cleanup Procedures. Within authorization security factors 1020 is Granularity of Protected "Objects", Flexibility of Assigning Users to Roles, Scope/Heterogeneity of Authorization Solution, Authorization Cleanup-Procedures, and Least Privileges and Separation of Duties. Within auditing security factors 1030 is Enablement of Auditing, Scope of Audits, Frequency of Audits, Existence & Sophistication of Alerts based on Audit Results, Retention of Audit Logs, Processes for Regular Reviews of Audit Logs, and Processes to Follow Up on Violations based on Audit Log Analysis/Alerts. Within encryption security factors 1040 is Encryption Algorithms, Encryption Scope, and Key Storage. Within Security-Related Organizational Structures & Processes 1050 is Change Management Processes Protecting Against Invalid Updates, Regular/Ongoing Review, Testing and Certification of Security Controls, Processes to act on Security Violations, and Organizational Structures Ensuring Accountability. Finally, within Secure Platform security factors 1060 is Certification of the System/Platform as Secure, Certification of the Network as Secure, and Certification of the Hardware as Secure.

Figure 11:
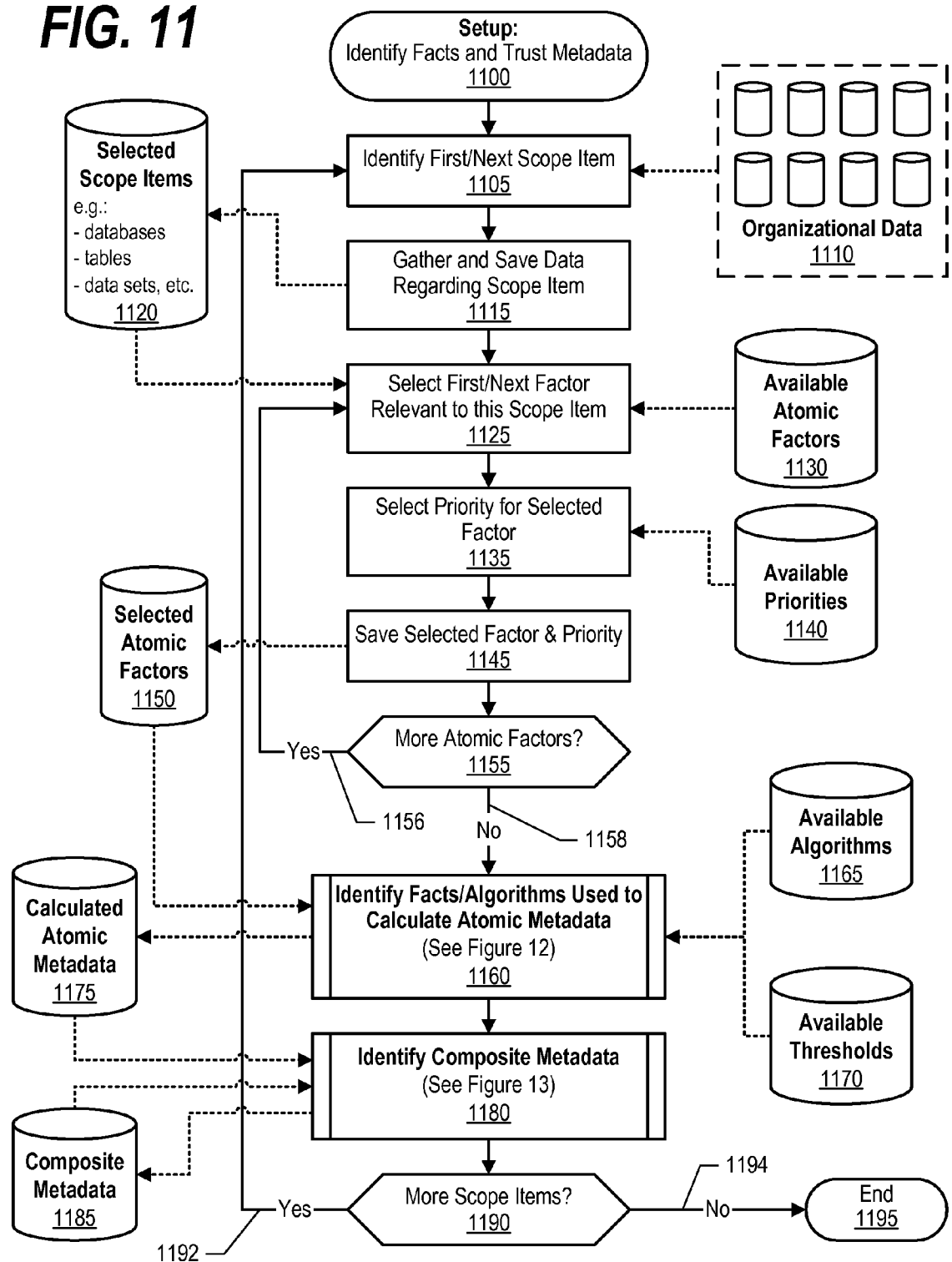
FIG. 11 is a flowchart showing steps taken to setup the trust index repository for an organization by identifying the organization's facts and trust metadata.

FIG. 11 is a flowchart showing steps taken to setup the trust index repository for an organization by identifying the organization's facts and trust metadata. Setup processing commences at 1100 whereupon, at step 1105, the first scope item is identified from organization data 1110. Organizational data 1110 includes the data stores maintained or available to an organization (e.g., databases, flat files, tables, etc.). For example, a customer table might be identified in step 1105. At step 1115, metadata is gathered regarding the selected scope item (e.g., type of scope item (database table, flat file, etc.), location of the scope item, access method(s) used to access the scope item, etc.). This gathered data is stored in selected scope items data store 1120. At step 1125, the first trust factor that is relevant to this scope item is selected from available atomic trust factors data store 1130 (see FIGS. 5-10 and corresponding text for numerous examples and descriptions of various atomic trust factors). At step 1135, a priority is selected for the selected atomic trust factor from available priorities data store 1140. In one embodiment, selection of a priority is optional. In one embodiment priorities can be coarse-grained or fine-grained. When priorities are coarse-grained, the priorities are selected from a coarse-grained list (e.g., "high priority," "medium priority," "low priority," and "not applicable."). When priorities are fine-grained, the priorities are selected from a fine-grained list (e.g., a specific value from 0 (low) to 10 (high) or even finer grained from 0 (low) to 100 (high), etc.). At step 1145, the selected atomic trust factor is stored in selected atomic trust factors data store 1150 along with the priority (if any) to use with the atomic trust factor. A determination is made as to whether there are more atomic trust factors to select for the selected scope item (decision 1155). If there are more atomic trust factors, then decision 1155 branches to "yes" branch 1156 which loops back for selection and storage of the next atomic trust factor and its priority. This looping continues until there are no more atomic trust factors to select for the selected scope item, at which point decision 1155 branches to "no" branch 1158.

Figure 12:
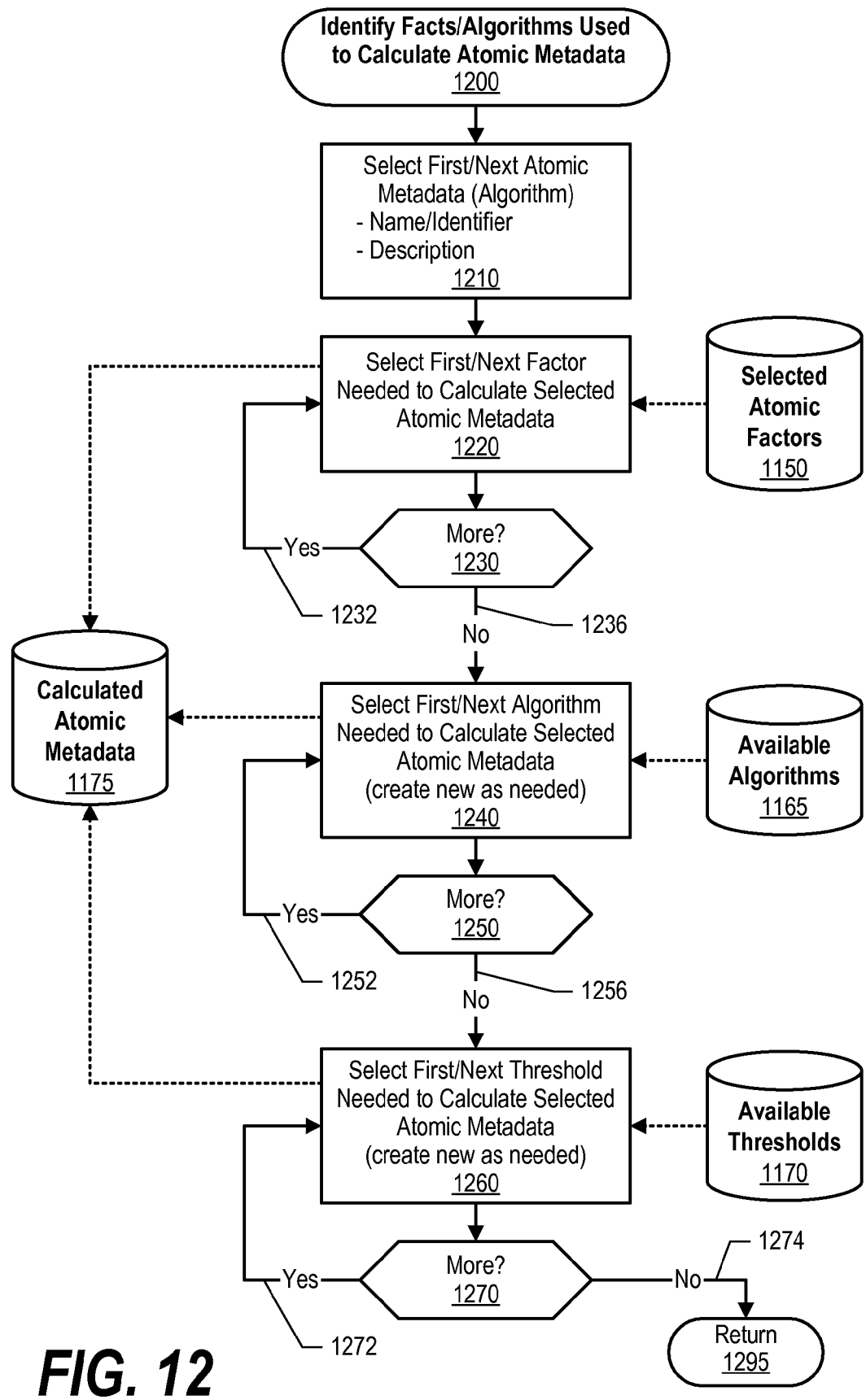
FIG. 12 is a flowchart showing steps taken to identify the facts and algorithms used to calculate atomic trust metadata.

At predefined process 1160, facts and algorithms that are used to calculate atomic trust factor scores are identified and stored (see FIG. 12 and corresponding text for processing details). Predefined process 1160 uses available algorithms from available algorithms data store 1165 and available thresholds from available thresholds data store 1170 as inputs and results with calculated atomic trust scores stored in calculated atomic metadata 1175.

At predefined process 1180, composite metadata is identified. As previously described, composite metadata can use atomic metadata scores, facts, and other composite metadata in order to generate composite metadata (shown stored in composite metadata data store 1185.

A determination is made as to whether there are more scope items (e.g., database tables, files, etc.) to identify and process (decision 1190). If there are more scope items to identify and process, then decision 1190 branches to "yes" branch 1192 which loops back to identify the next scope item and process it in conformance with the steps outlined above. This looping continues until there are no further scope items that the organization wishes to identify and process, at which point decision 1190 branches to "no" branch 1194 and setup processing ends at 1195. Of course, the organization can choose to return to the processing shown in FIG. 11 to identify additional scope items and to enhance and refine the corresponding trust factors (atomic and composite) that apply to selected scope items 1120.

FIG. 12 is a flowchart showing steps taken to identify the facts and algorithms used to calculate atomic trust metadata. FIG. 12 presents detailed steps for the processing that is performed by predefined process 1160 shown in FIG. 11. In FIG. 12, processing commences at 1200 whereupon, at step 1210, the first atomic metadata (e.g., an algorithm, etc.) is selected using the atomic metadata's name or identifier and description in order to select the desired atomic metadata. At step 1220, the first atomic trust factor needed to calculate the selected atomic metadata is selected from selected atomic trust factors data store 1150. A determination is made as to whether additional atomic trust factors are needed in order to calculate the selected atomic metadata (decision 1230). If additional atomic trust factors are needed, then decision 1230 branches to "yes" branch 1232 which loops back to select the next atomic trust factor from data store 1150. This looping continues until all of the needed atomic trust factors that are needed by the selected atomic metadata have been selected, at which point decision 1230 branches to "no" branch 1236. As shown, the selected atomic trust factors are stored in calculated atomic metadata data store 1175.

At step 1240, the first algorithm that is needed to calculate the selected atomic metadata is selected from available algorithms data store 1165. In one embodiment, multiple algorithms exist for some atomic metadata and in step 1240 the user selects the algorithm most appropriate for the organization. If no algorithm currently exists, or the existing algorithms are not appropriate for the organization, then the user can create a new algorithm or modify an existing algorithm so that it works for the organization. A determination is made as to whether additional algorithms are needed to calculate the selected atomic metadata (decision 1250). If additional algorithms are needed, then decision 1250 branches to "yes" branch 1252 which loops back to select the next algorithm. As shown, the selected one or more algorithms are stored in calculated atomic metadata data store 1175. When no more algorithms are needed to calculate the selected atomic metadata, then decision 1250 branches to "no" branch 1256.

At step 1260, the first threshold that is needed to calculate the selected atomic metadata is selected from available thresholds data store 1170. In one embodiment, multiple thresholds exist for some atomic metadata and in step 1260 the user selects the threshold(s) most appropriate for the organization. If no thresholds currently exists, or the existing thresholds are not appropriate for the organization, then the user can create a new threshold or modify an existing threshold so that it works for the organization. A determination is made as to whether additional thresholds are needed to calculate the selected atomic metadata (decision 1270). If additional thresholds are needed, then decision 1270 branches to "yes" branch 1272 which loops back to select the next threshold. As shown, the selected one or more thresholds are stored in calculated atomic metadata data store 1175. When no more thresholds are needed to calculate the selected atomic metadata, then decision 1270 branches to "no" branch 1274 and processing returns to the calling routine (e.g., FIG. 11) at 1295.

Figure 13:
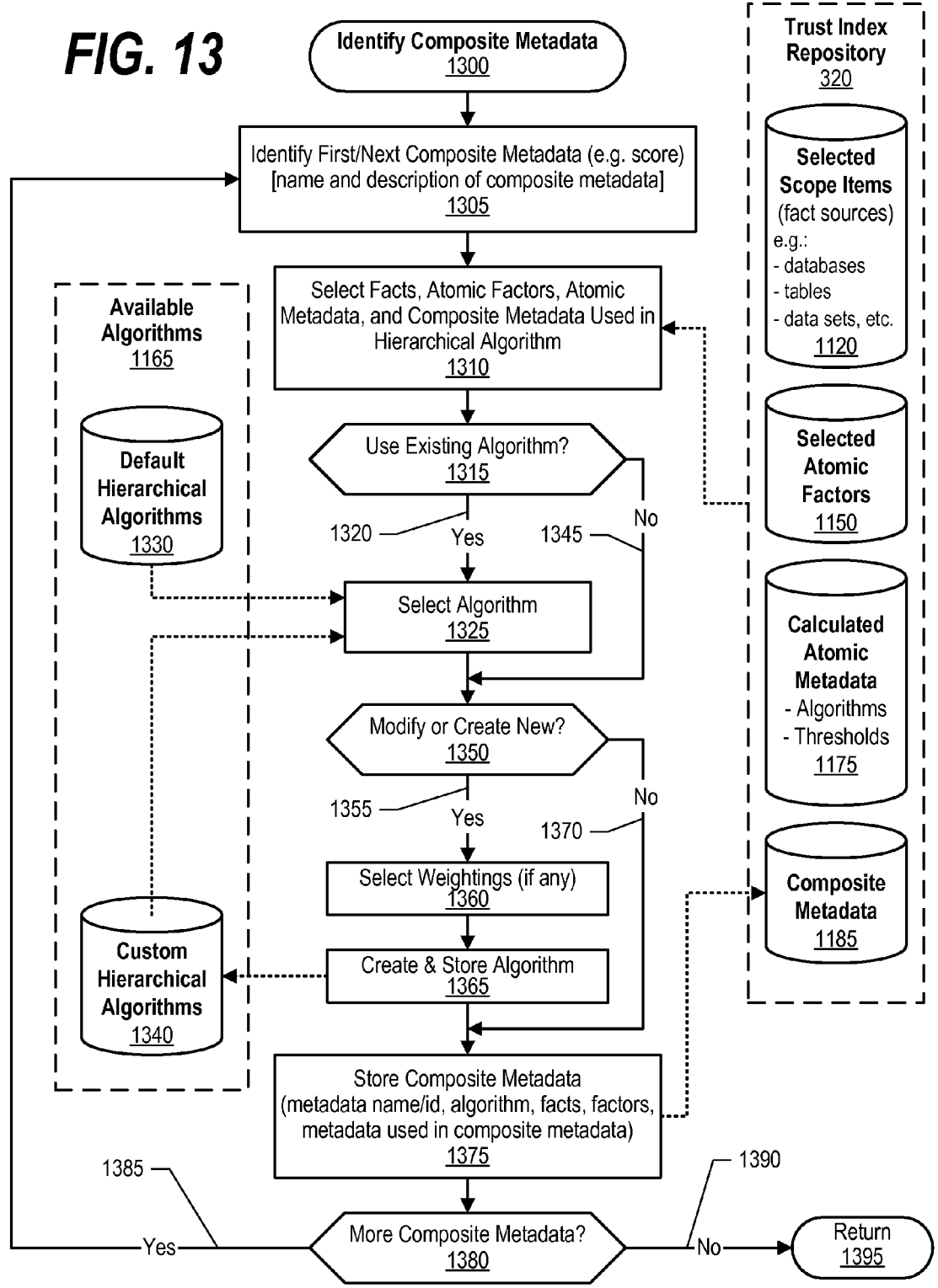
FIG. 13 is a flowchart showing the steps taken to identify composite metadata.

FIG. 13 is a flowchart showing the steps taken to identify composite metadata. FIG. 13 presents detailed steps for the processing that is performed by predefined process 1180 shown in FIG. 11. In FIG. 13, processing commences at 1300 whereupon, at step 1305, the first composite metadata, such as a composite trust score, is identified based on a name/identifier and/or a description of the composite metadata. At step 1310, the facts, atomic trust factors, atomic metadata, and composite metadata that are used in a composite metadata algorithm (e.g., hierarchical algorithm) are selected from trust index repository 320. A determination is made as to whether an existing algorithm is used (decision 1315). If an existing algorithm is being used, then decision 1315 branches to "yes" branch 1320 whereupon, at step 1325, an algorithm is selected from available algorithms 1165. Available algorithms 1165 includes default hierarchical algorithms stored in default hierarchical algorithms data store 1330 as well as custom hierarchical algorithms stored in custom hierarchical algorithms 1340. Default and custom algorithms can be stored in a common data store or in separate data stores as shown. If the user does not wish to use an existing algorithm, then decision 1315 branches to "no" branch 1345 bypassing step 1325.

A determination is made as to whether the user wishes to modify an existing available algorithm selected from available algorithms 1165 or create a new algorithm (decision 1350). If the user wishes to modify or create a new algorithm, then decision 1350 branches to "yes" branch 1355 whereupon, at step 1360, weightings that should be applied to the algorithm (if any) are selected by the user and, at step 1365, the new/modified algorithm is created and stored along with any weightings that are used with the algorithm. The algorithm is stored in custom hierarchical algorithms data store 1340. On the other hand, if the user does not wish to create a new or modified hierarchical algorithm, then decision 1350 branches to "no" branch 1370 bypassing steps 1360 and 1365.

At step 1375, the composite metadata that was constructed using steps 1305 to 1365 is stored in composite metadata data store 1185 in trust index repository 320. The composite metadata is stored along with identification data (name/identifier/description of the composite metadata), the algorithm itself, and the facts and trust factors used in the algorithm. A determination is made as to whether the user wishes to configure additional composite metadata (decision 1380). If the user wishes to create additional composite metadata, then decision 1380 branches to "yes" branch 1385 which loops back to identify the next composite metadata and gather the data needed to generate the newly identified metadata. This looping continues until the user does not wish to identify further composite metadata, at which point decision 1380 branches to "no" branch 1390 and processing returns to the calling routine (e.g., FIG. 11) at 1395.

Figure 14:
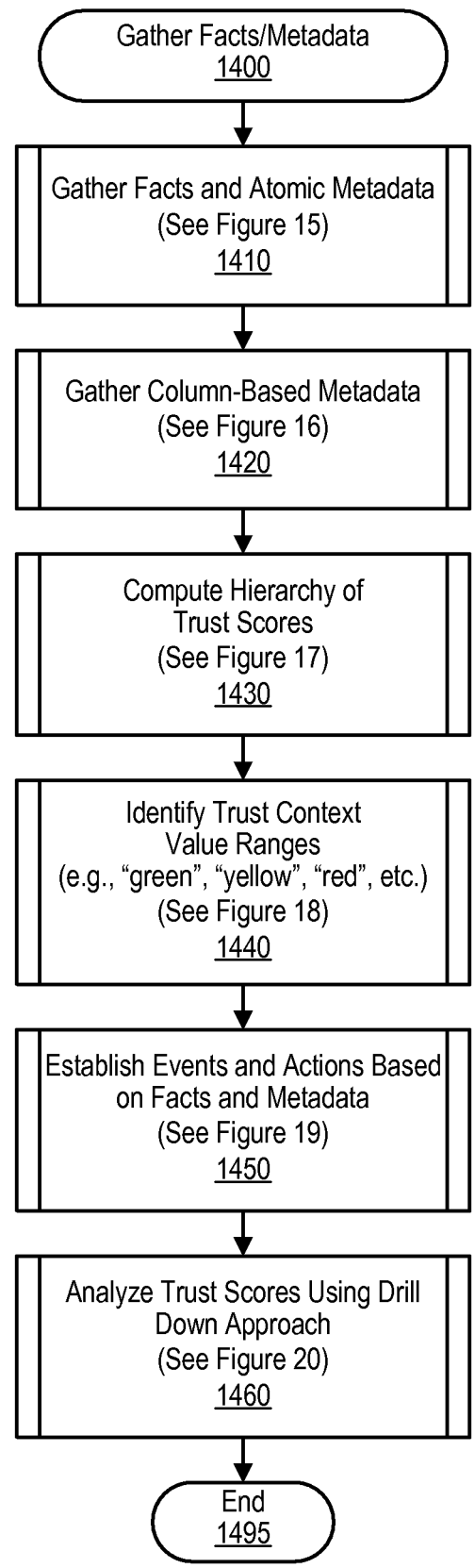
FIG. 14 is a high-level flowchart showing steps taken to gather facts and metadata for an organization.

FIG. 14 is a high-level flowchart showing steps taken to gather facts and metadata for an organization. Processing commences at 1400 whereupon, at predefined process 1410, the organizational facts and atomic trust metadata are gathered (see FIG. 15 and corresponding text for processing details). Column-based atomic metadata is gathered at predefined process 1420 (see FIG. 16 and corresponding text for processing details). Next, the hierarchy of composite trust scores is computed using the processing provided by predefined process 1430 (see FIG. 17 and corresponding text for processing details). Granular trust ranges are identified using predefined process 1440 (see FIG. 18 and corresponding text for processing details). For example, using a green-yellow-red metaphor, trust ranges can be defined to provide context to trust scores. Using the green-yellow-red metaphor, trust scores that are "green" are noted as safe, while those that are yellow should be used with caution, and those that are red should be avoided.

Figure 19:
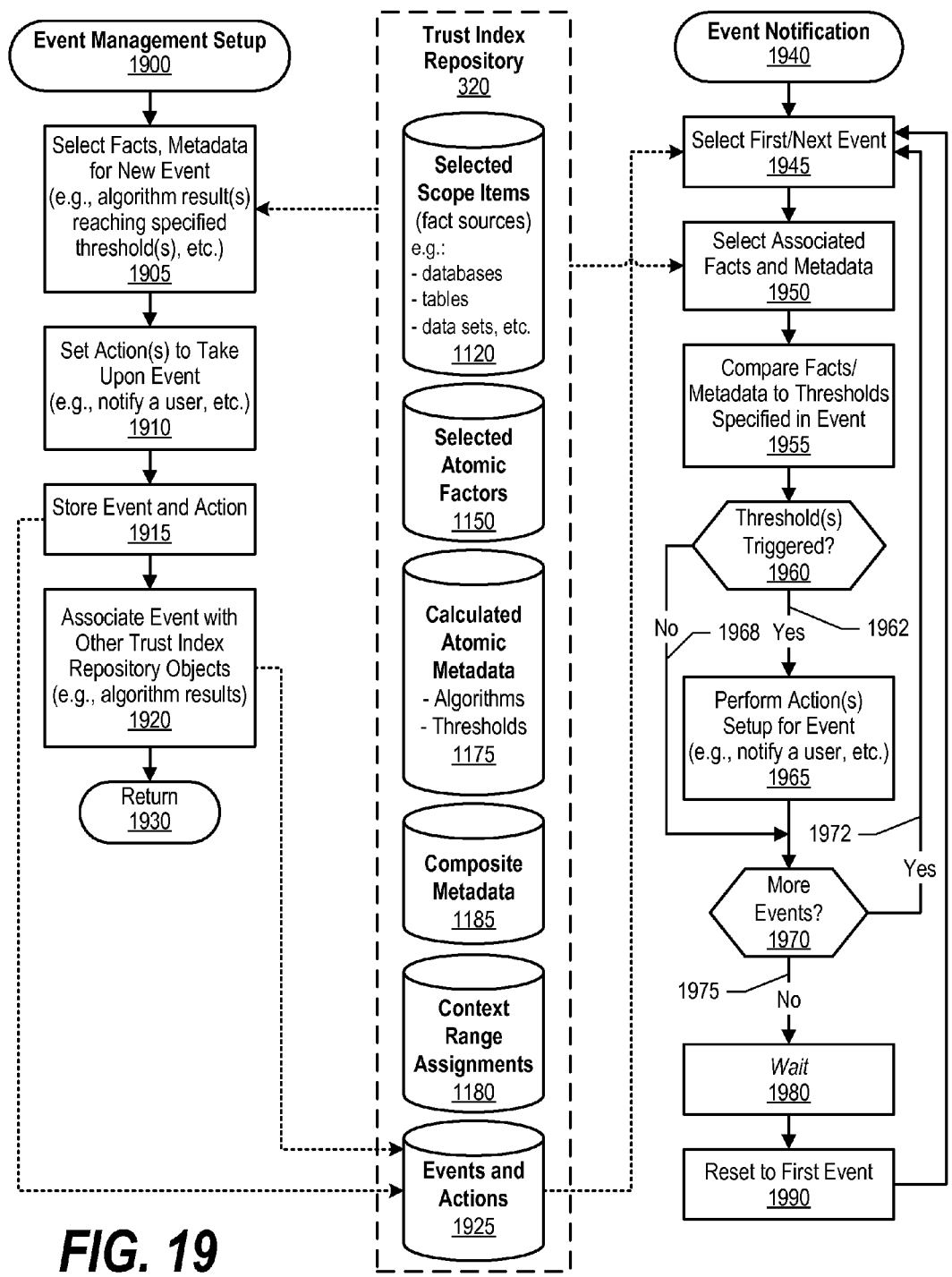
FIG. 19 is a flowchart showing steps taken to establish events and actions that are based on facts and metadata.

At predefined process 1450, events and actions that are based on facts and metadata (both atomic and composite) are established (see FIG. 19 and corresponding text for processing details). In predefined process 1450, thresholds are established and monitored. When a trust data item reaches the threshold, a predefined action takes place, such as notifying an information consumer. Information consumers can analyze trust data using a "drill-down" approach provided by predefined process 1460 (see FIG. 20 and corresponding text for processing details). This drill-down approach allows the user to analyze the underlying facts and metadata corresponding to a particular trust score. Using the drill down approach provided in predefined process 1460, the user can better understand why a trust index is a particular value and therefore make a better determination as to whether the facts and metadata can be trusted.

Figure 15:
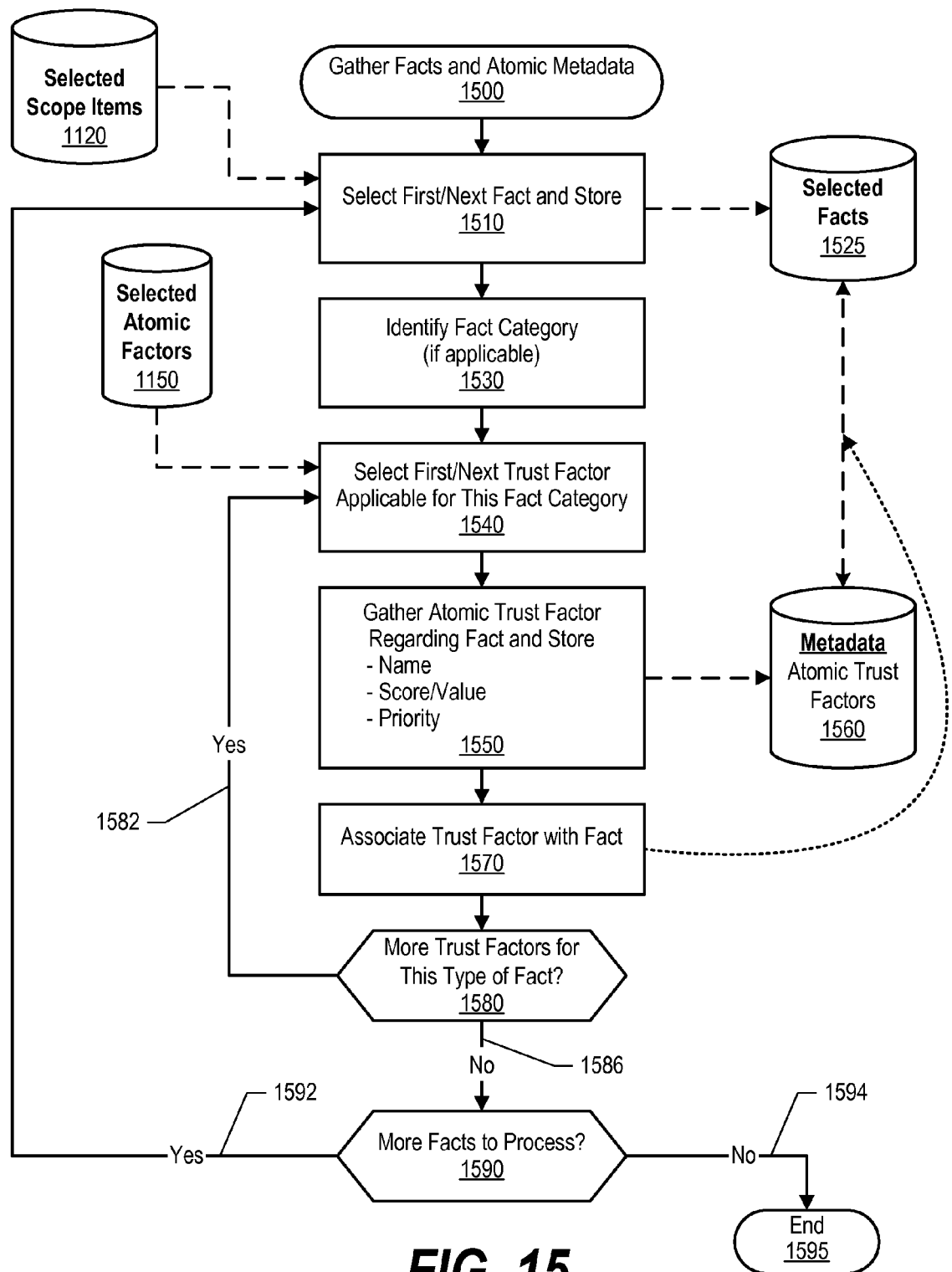
FIG. 15 is a flowchart showing steps taken to gather facts and atomic metadata.

FIG. 15 is a flowchart showing steps taken to gather facts and atomic metadata. FIG. 15 presents detailed steps for the processing that is performed by predefined process 1410 shown in FIG. 14. In FIG. 15, processing commences at 1500 whereupon, at step 1510, the first fact is selected from selected scope items 1120 and stored in selected facts data store 1525. At step 1530, a fact category is selected (if applicable) for the selected fact. At step 1540, the first atomic trust factor that is applicable for the selected fact category is selected (or the first atomic trust factor is selected that is applicable to the selected fact if no fact category was selected at step 1530).

At step 1550, atomic trust factor data is gathered based on the selected fact and the selected atomic trust factor. This data includes the name of the atomic trust factor, the score/value (or algorithm), and the priority (or weighting) to apply to the atomic trust factor. The gathered data is stored in atomic trust factors metadata (data store 1560). At step 1570, the trust factor that was stored in data store 1560 is associated with the selected fact that was stored in data store 1525. A determination is made as to whether there are additional trust factors for this fact category or type of fact (decision 1580). If there are more trust factors to identify, then decision 1580 branches to "yes" branch 1582 which loops back to select the next trust factor and process the selected trust factor accordingly. This looping continues until there are no more trust factors for this type of fact, at which point decision 1580 branches to "no" branch 1586.

A determination is made as to whether there are more facts to identify and process from within selected scope items 1120 (decision 1590). If there are more facts to process, then decision 1590 branches to "yes" branch 1592 which loops back to select the next fact at step 1510 and process it accordingly. This looping continues until there are no further facts to process, at which point decision 1590 branches to "no" branch 1594 and returns to the calling routine (e.g., FIG. 14) at 1595.

Figure 16:
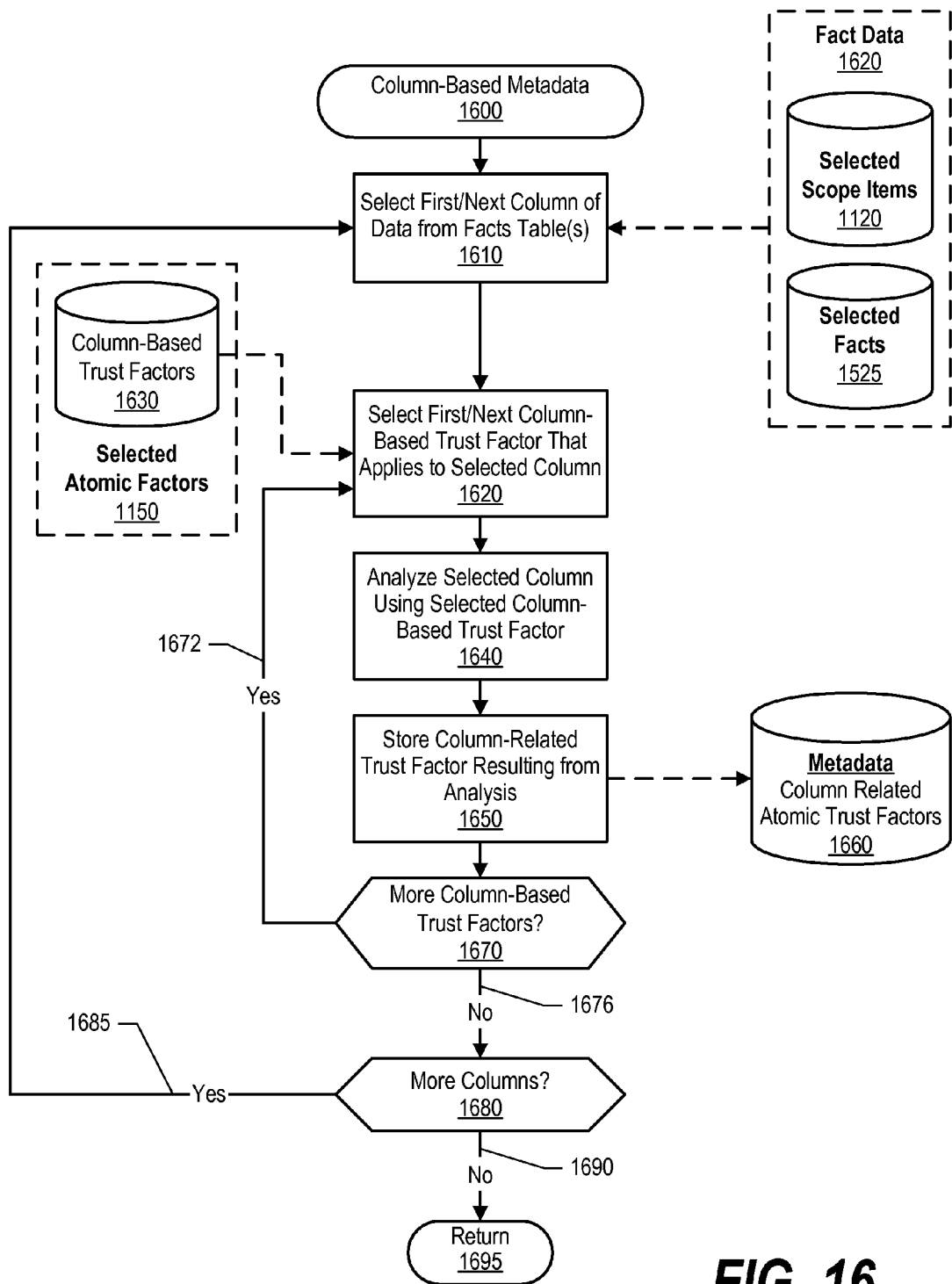
FIG. 16 is a flowchart showing steps taken to gather column-based metadata.

FIG. 16 is a flowchart showing steps taken to gather column-based metadata. FIG. 16 presents detailed steps for the processing that is performed by predefined process 1420 shown in FIG. 14. In FIG. 16, processing commences at 1600 whereupon, at step 1610, a first column of data is selected from fact data 1620. Fact data 1620 includes selected scope items 1120 and selected facts 1525. So, for example, at step 1610, a particular column could be selected from a database table that was included in the selected scope items and identified as a selected fact. At step 1620, the first column-based trust factor that applies to the selected column of data is selected from column-based trust factors 1630 that were included in selected atomic trust factors 1150. For examples of column-based trust factors see FIG. 7, trust factors 730-744, and FIG. 8, trust factors 810 to 824.

Retuning to FIG. 16, at step 1640, the selected column of data is analyzed using the selected column-based trust factor. For example, if the selected column-based trust factor is "data format violations" (trust factor 731 in FIG. 7), then the column would be analyzed to determine the extent of data that violates the data format that pertains to the column. If the column of data is a state abbreviation for customer addresses, the data format may be a two-letter state abbreviation so that any state designations that are not proper two-letter abbreviations would be counted as a data format violation. At step 1650, the trust factor (score) resulting from the analysis is stored in column-related atomic trust factors metadata store 1660. In one embodiment the raw result of the column-related atomic trust factor is stored, such as a percentage of data format violations found in the data. In another embodiment, a coarse-grained result is stored, such as whether the amount of data format violations falls within a "green" range, a "yellow" range, or a "red" range indicating that the data with respect to data format violations can be trusted (green), used with caution (yellow), or should not be trusted (red). In another embodiment, a fine-grained result is stored in data store 1660 resulting from the algorithm (such as a range of 1-9 where higher values (e.g., 7-9) indicate that the data can be trusted with respect to data format violation, whereas lower values (e.g., 1-3) indicate that the data cannot be trusted with respect to data format violations.

A determination is made as to whether there are more column-based trust factors to select and use for analysis for the selected column of data (decision 1670, see other column-based trust factors in FIGS. 7 and 8 for further examples). If more column-based trust factors are being used, then decision 1670 branches to "yes" branch 1672 which loops back to select the next column-based trust factor that applies to the selected column from data store 1630 and analyzes the data accordingly. This looping continues until there are no more column-based trust factors to select and analyze for the selected column of data, at which point decision 1670 branches to "no" branch 1676.

A determination is made as to whether there are more columns of data to select and analyze using one or more of the column-based trust factors (decision 1680). If there are more columns of data to select, then decision 1680 branches to "yes" branch 1685 which loops back to select the next column of data from fact data 1620 (selected scope items 1120 and selected facts 1525). This looping continues until there are no more columns of data that the user or organization wishes to select and analyze, at which point decision 1680 branches to "no" branch 1690 and processing returns to the calling routine (e.g., FIG. 14) at 1695.

Figure 17:
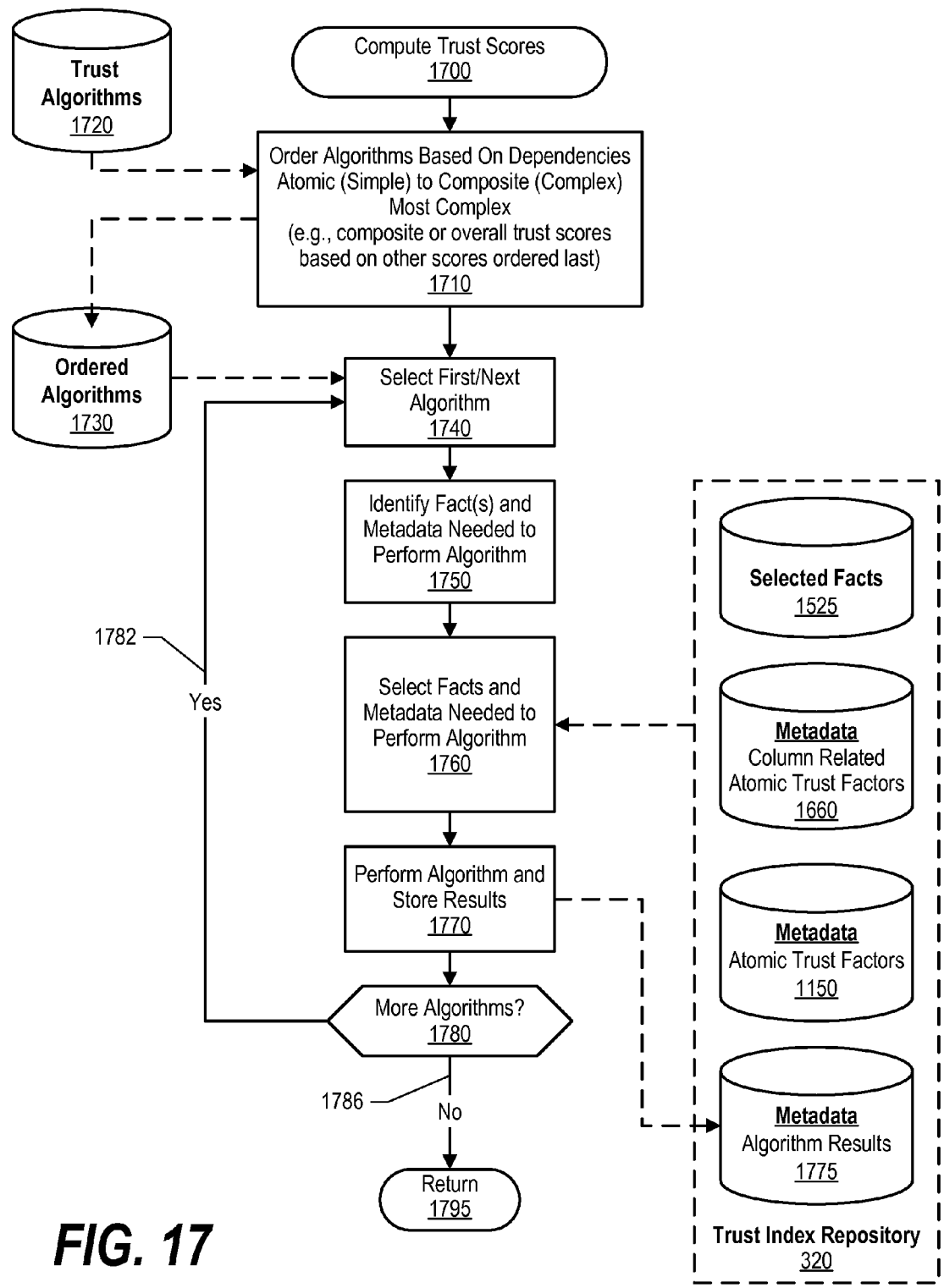
FIG. 17 is a flowchart showing steps taken to compute a hierarchy of trust scores.

FIG. 17 is a flowchart showing steps taken to compute a hierarchy of trust scores. FIG. 17 presents detailed steps for the processing that is performed by predefined process 1430 shown in FIG. 14. In FIG. 17, processing commences at 1700 whereupon, at step 1710, the trust algorithms are ordered (sorted) based on their dependencies to one another. Atomic algorithms (those that use facts and atomic metadata scores) are sorted to the beginning of the list while algorithms that are used for more complex composite trust factors are sorted to the end of the list. Consideration is also taken for dependencies of composite trust factors so that if the algorithm for composite trust factor "Z" uses the result of composite trust factors "X" and "Y", then "X" and "Y" are placed in the list before "Z." Likewise, if "Y" uses the result of "X" then it would be placed after "X" in the list (so the order in ordered algorithms, in this case, would be X-Y-Z). Trust algorithms 1720 are read at step 1710 and the resulting sorted (ordered) list of algorithms is stored in ordered algorithms data store 1730.

After the algorithms have been sorted in order to account for any dependencies as described above, at step 1740 the first algorithm is selected from order algorithms data store 1730. The first algorithm selected, as described above, is likely an atomic algorithm that uses facts and atomic metadata in the algorithm rather than using composite scores in the algorithm. At step 1750, the facts and trust metadata needed to compute the selected algorithm are identified. At step 1760, the identified facts and trust metadata are selected from trust index repository 320. As shown, trust index repository includes several data stores including selected facts data store 1525 (facts identified for the organization), column-related atomic trust factors 1660, atomic trust factors 1150, and algorithm results 1775 (results of both atomic algorithms and composite algorithms). At step 1770, the selected algorithm is performed and the results are stored in algorithm results 1775. As previously described, various types of results can be stored in data store 1775 ranging from the actual value of the algorithm that is not set to a particular scale, a coarse-grained result (e.g., "green," "yellow," "red," etc.), and/or a fine-grained result (e.g., a range of 1-9 or 1-100 where higher values (e.g., 7-9 or 70-100) indicate that the data can be trusted, whereas lower values (e.g., 1-3 or 1-30) indicate that the data cannot be trusted.

A determination is made as to whether there are more algorithms to execute that are stored in ordered algorithms data store 1730 (decision 1780). If there are more algorithms to process, then decision 1780 branches to "yes" branch 1782 which loops back to select and process the next algorithm from ordered algorithms data store 1730. This looping continues until there are no more algorithms to process, at which point decision 1780 branches to "no" branch 1786 and processing returns to the calling routine (see FIG. 14) at 1795.

Figure 18:
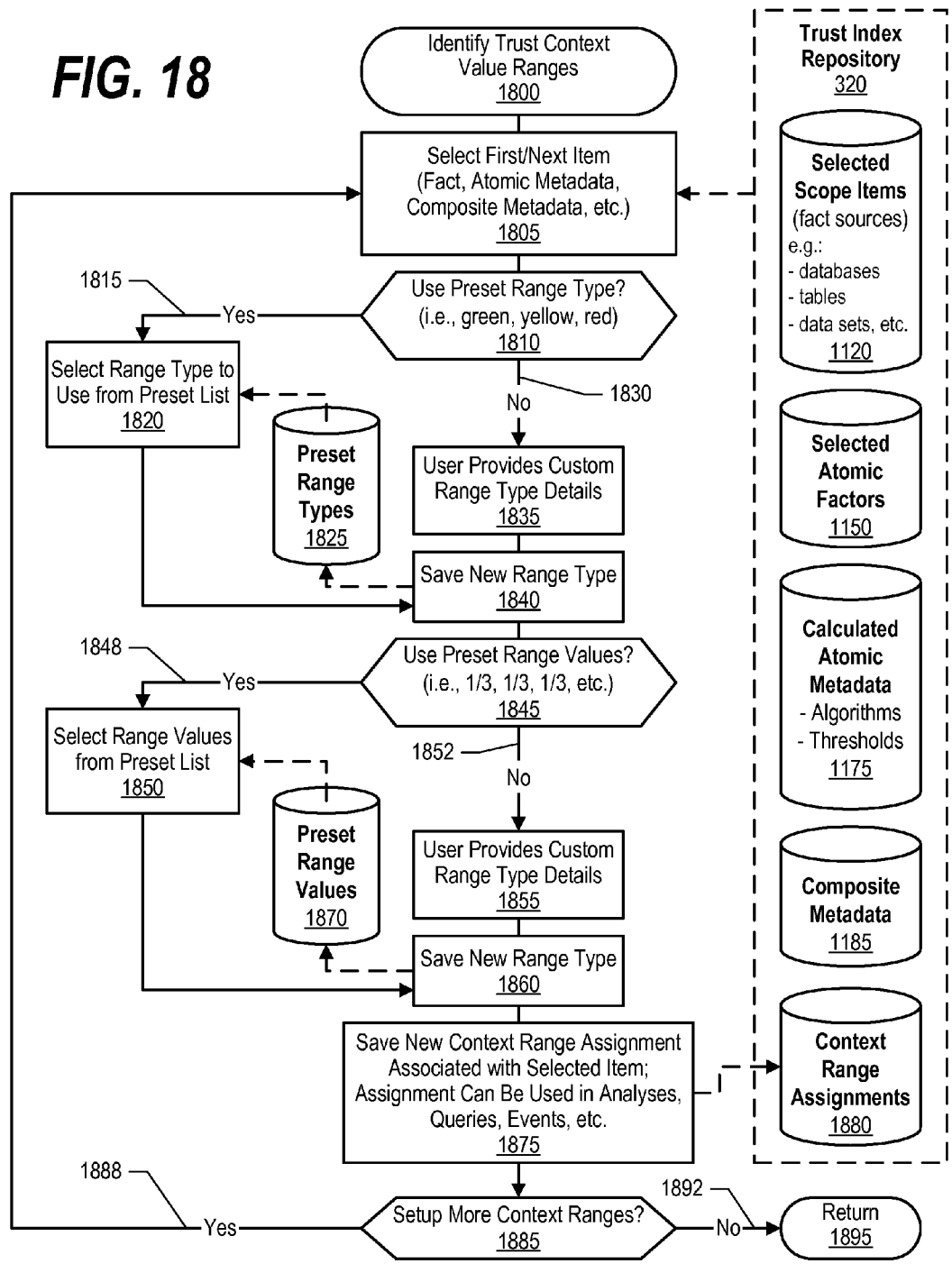
FIG. 18 is a flowchart showing steps taken to identify trust context value ranges.

FIG. 18 is a flowchart showing steps taken to identify trust context value ranges. FIG. 18 presents detailed steps for the processing that is performed by predefined process 1440 shown in FIG. 14. In FIG. 18, processing commences at 1800 whereupon, at step 1805, a first item is selected from trust index repository 320. As previously discussed, trust index repository 320 includes a number of data stores with each data store including a number of items. These data stores include atomic factors 1150, calculated atomic metadata 1175, and composite metadata 1185 as well as other data stores.

A determination is made as to whether to use a preset range for the selected item (decision 1810). Preset range types include the green-yellow-red type as well as other range types that may be understood by employees of a particular organization. If a preset range type is being used, then decision 1810 branches to "yes" branch 1815 whereupon, at step 1820, the user selects a range type to use from preset range types data store 1825. On the other hand, if the user does not wish to use a preset range type, then decision 1810 branches to "no" branch 1830 whereupon, at step 1835 the user creates a custom range type and at step 1840 the new range type is stored in preset range types data store 1825 so that the newly created range type will be available for future selections.

After a range type has been selected (either a preset or custom range type), then a determination is made as to whether to use preset range values for the range type or custom range values (decision 1845). If a preset range type is being used, then decision 1845 branches to "yes" branch 1848 whereupon, at step 1850, the range values to apply to the selected range type are selected from preset range values data store 1870. For example, if the range type includes three context values (e.g., green-yellow-red) then a possible set of range values would be 7-9 for green, 4-6 for yellow, and 1-3 for red. Likewise, if the range type includes four context values (e.g., "great-good-marginal-poor"), then a possible set of range values would be 8-9 for great, 6-7 for good, 4-5 for marginal, and 1-3 for poor. On the other hand, if the user does not wish to use preset range values, then decision 1845 branches to "no" branch 1852 whereupon, at step 1855, the user provides custom range values for the range type and, at step 1860, the custom range values are stored in data store 1870. For example, if using the green-yellow-red range type but the user wants more stringent values than the default 7-9 for green, 4-6 for yellow, and 1-3 for red, the user can set up more stringent values (e.g., 9 for green, 7-8 for yellow, and 1-6 for red).

At step 1875, the new context range assignment is stored in context range assignment data store 1880 and is associated with the item that was selected back at step 1805. After being established, the context value can now be used in analyses, queries, to monitor events, and the like. In other words, a user can request to be notified when a particular trust index value is "green" rather than having to specify a numeric value. A determination is made as to whether the user wishes to setup more context ranges for additional items (decision 1885). If more context ranges are being established for other items, then decision 1885 branches to "yes" branch 1888 which loops back to select the next item and process the next item. This looping continues until no more context ranges are being setup for items, at which point decision 1885 branches to "no" branch 1892 whereupon processing returns to the calling routine (see FIG. 14) at 1895.

FIG. 19 is a flowchart showing steps taken to establish events and actions that are based on facts and metadata. FIG. 19 presents detailed steps for the processing that is performed by predefined process 1450 shown in FIG. 14. In FIG. 19, processing commences at 1900 whereupon, at step 1905, the user selects facts or a trust factor from trust index repository 320 for a particular event. For example, the user can request an event to occur when a particular composite trust value reaches a particular threshold, such as "green" when using the context ranges established in FIG. 18. At step 1910 the user sets up one or more actions that should occur when the event occurs. Examples of actions would include notifying a user of the system with an email message, running a particular process or report, etc. At step 1915, the event and actions are stored in events and actions data store 1925. At step 1920, the event is associated with other trust index repository objects, such as a composite metadata score stored in data store 1185. The user repeats steps 1905 to 1920 to setup additional events and actions as needed. Event management setup processing ends at 1930.

Event notification processing commences at 1940 whereupon, at step 1945, the first event that is being monitored is selected from events and actions data store 1925. At step 1950, the associated fact(s) and/or metadata that correspond to the selected event are selected and the current values of these facts/metadata are retrieved. At step 1955, the retrieved facts/metadata is/are compared with the thresholds retrieved from the selected event from data store 1925. A determination is made as to whether, based on the comparison, the threshold(s) in the selected event have been triggered (decision 1960). If the event has been triggered, then decision 1960 branches to "yes" branch 1962 whereupon, at step 1965, one or more actions that were stored in events and actions data store 1925 are performed (e.g., notifying a user using an email message, etc.). On the other hand, if the thresholds have not been triggered, then decision 1960 branches to "no" branch 1968 bypassing step 1965.

A determination is made as to whether there are more events that are being monitored in events and actions data store 1925 (decision 1970). If there are more events that are being monitored, then decision 1970 branches to "yes" branch 1972 which loops back to select and process the next event from events and actions data store 1925. This looping continues until all events have been processed, at which point decision 1970 branches to "no" branch 1975. At step 1980, processing waits for an amount of time (e.g., five minutes, one day, etc.). At step 1990, processing resets to the first event and loops back to re-process events and actions data store 1925 starting with the first event.

Figure 20:
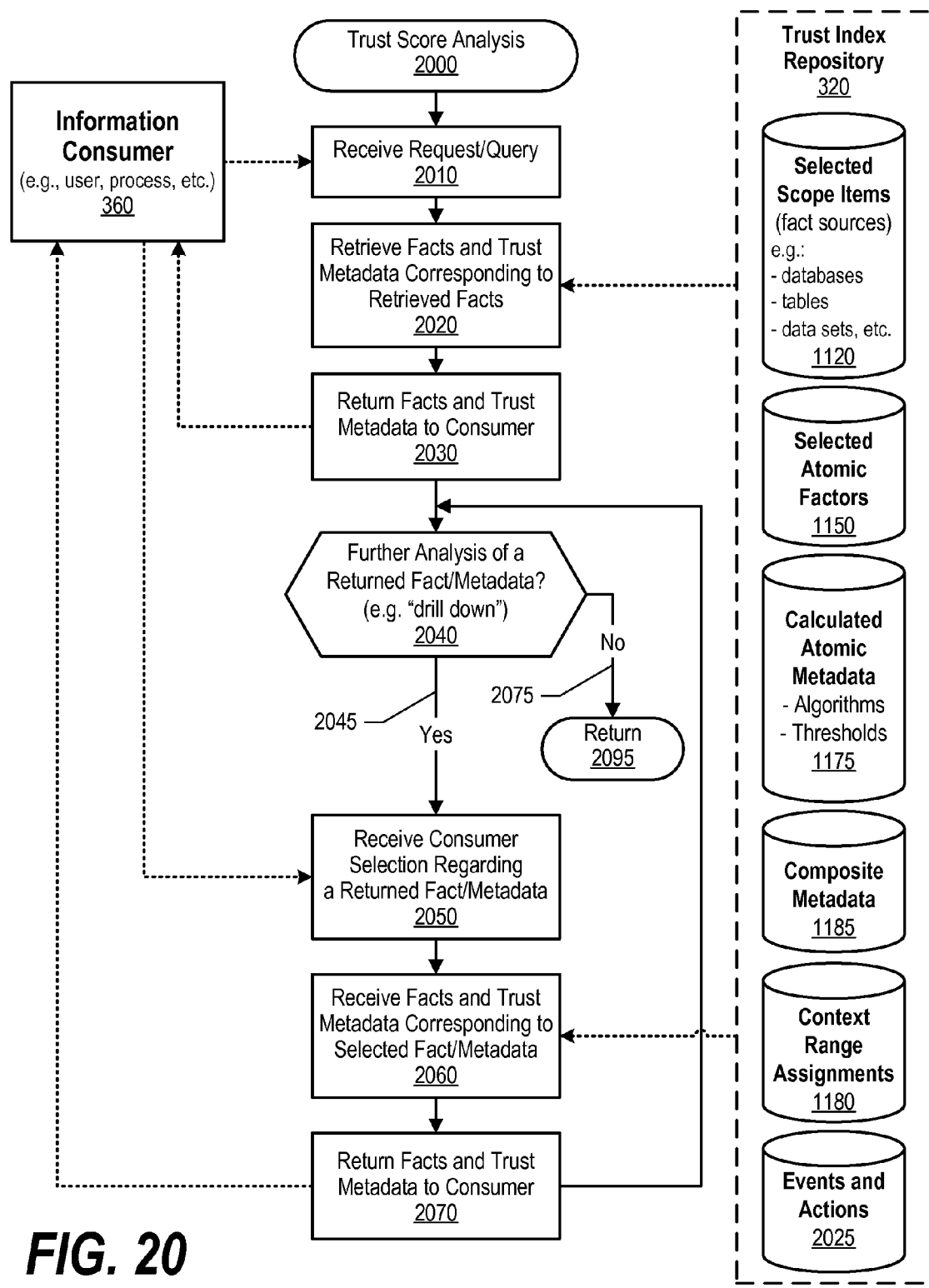
FIG. 20 is a flowchart showing steps taken to analyze trust scores using a drill-down approach.

FIG. 20 is a flowchart showing steps taken to analyze trust scores using a drill-down approach. FIG. 20 presents detailed steps for the processing that is performed by predefined process 1460 shown in FIG. 14. In FIG. 20, processing commences at 2000 whereupon, at step 2010, a request or query is received from information consumer 360. As shown, information consumer 360 can be a user or a separate information process that retrieves trust-related information from the trust index repository. At step 2020, facts and trust metadata are retrieved from trust index repository 320 with the retrieved facts and trust metadata corresponding to the information consumer's request or query. At step 2030, the retrieved facts and/or trust metadata are returned to information consumer 360. A determination is made as to whether the information consumer requests further analysis of the trust/metadata that was returned in step 2030 (decision 2040). These further requests are called "drill-down" as the information consumer is retrieving further levels of data that explore the data, such as why a metadata score is a particular value. For example, if a composite metadata value has a context value of "yellow," the user can drill down into the composite metadata value in order to understand what caused the value to be "yellow" instead of "green" or "red." If the factors that contributed to the value being yellow are less important to the user, then the user can make a subjective decision to discount the factor and place more trust in the composite value. Likewise, if the factors that contributed to the value being yellow are more troubling, then the user can subjectively decide to place less trust in the composite value.

If the user requests further information, then decision 2040 branches to "yes" branch 2045 whereupon, at step 2050, the drill-down request is received from the information consumer about one or more previously returned facts or metadata. At step 2060, facts and other metadata that correspond to the metadata selected by the user are retrieved (e.g., the metadata/facts that were used to compute a composite metadata score, etc.). At step 2070, these underlying facts and metadata are returned to information consumer 360. Processing loops back to decision 2040 to see if the information consumer has further drill down requests. This looping continues as long as the information consumer has further drill down requests. When the information consumer has no further drill down requests, then decision 2040 branches to "no" branch 2075 and processing returns to the calling routine (see FIG. 14) at 2095.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   selecting one or more trust factors from a plurality of trust factors included in a trust index repository;
   receiving one or more priority values that correspond to one or more of the trust factors;
   generating, by a processor, utilizing the one or more priority values, one or more trust metadata scores that correspond to the one or more trust factors;
   identifying one or more thresholds corresponding to one or more of the selected trust factors;
   determining that one or more of the trust metadata scores reach one or more of the identified thresholds; and
   performing one or more actions in response to determining that one or more of the trust metadata scores reached one or more of the identified thresholds, wherein at least one of the actions includes sending an event notification to a trust data consumer that includes one or more of the trust metadata scores that reached one or more of the identified thresholds.

2. The method of claim 1 wherein the trust factors include one or more atomic trust factors and one or more composite trust factors and the trust metadata scores include one or more atomic metadata scores and one or more composite metadata scores.

3. The method of claim 2 further comprising:
- computing the atomic metadata scores using one or more facts retrieved from one or more data sources as input to the corresponding atomic trust factors; and
- computing the composite metadata scores using one or more of the atomic metadata scores as input to the composite trust factors.

4. The method of claim 3 wherein at least one of the composite trust factors uses at least one composite trust score as an input.

5. The method of claim 1 wherein the event notification is a message sent to a separate software process, and wherein the separate software process reacts according to at least one of the trust metadata scores.

6. The method of claim 1 wherein the event notification is a message sent to a person that informs the person that one of the trust metadata scores has reached the identified thresholds.

7. An information handling system comprising:
- one or more processors;
- a memory accessible by at least one of the processors;
- one or more nonvolatile storage devices accessible by at least one of the processors;
- a set of instructions which are loaded into memory and executed by at least one of the processors in order to perform actions of:
  - selecting one or more trust factors from a plurality of trust factors included in a trust index repository stored on at least one of the nonvolatile storage devices;
  - receiving one or more priority values that correspond to one or more of the trust factors;
  - generating, utilizing the one or more priority values, one or more trust metadata scores that correspond to the one or more trust factors;
  - identifying one or more thresholds corresponding to one or more of the selected trust factors;
  - determining that one or more of the trust metadata scores reach one or more of the identified thresholds; and
  - performing one or more actions in response to determining that one or more of the trust metadata scores reached one or more of the identified thresholds, wherein at least one of the actions includes sending an event notification to a trust data consumer that includes one or more of the trust metadata scores that reached one or more of the identified thresholds.

8. The information handling system of claim 7 wherein the trust factors include one or more atomic trust factors and one or more composite trust factors and the trust metadata scores include one or more atomic metadata scores and one or more composite metadata scores.

9. The information handling system of claim 8 wherein the instructions executed by at least one of the processors perform additional actions comprising:
- computing the atomic metadata scores using one or more facts retrieved from one or more data sources as input to the corresponding atomic trust factors; and
- computing the composite metadata scores using one or more of the atomic metadata scores as input to the composite trust factors.

10. The information handling system of claim 9 wherein at least one of the composite trust factors uses at least one composite trust score as an input.

11. The information handling system of claim 7 wherein the event notification is a message sent to a separate software process, and wherein the separate software process reacts according to at least one of the trust metadata scores.

12. A computer program product stored in a non-transitory computer readable medium, comprising functional descriptive material that, when executed by an information handling system, causes the information handling system to perform actions that include:
- selecting one or more trust factors from a plurality of trust factors included in a trust index repository;
- receiving one or more priority values that correspond to one or more of the trust factors;
- generating, utilizing the one or more priority values, one or more trust metadata scores that correspond to the one or more trust factors;
- identifying one or more thresholds corresponding to one or more of the selected trust factors;
- determining that one or more of the trust metadata scores reach one or more of the identified thresholds; and
- performing one or more actions in response to determining that one or more of the trust metadata scores reached one or more of the identified thresholds, wherein at least one of the actions includes sending an event notification to a trust data consumer that includes one or more of the trust metadata scores that reached one or more of the identified thresholds.

13. The computer program product of claim 12 wherein the trust factors include one or more atomic trust factors and one or more composite trust factors and the trust metadata scores include one or more atomic metadata scores and one or more composite metadata scores.

14. The computer program product of claim 2 further comprising functional descriptive material that causes the data processing system to perform additional actions comprising:
- computing the atomic metadata scores using one or more facts retrieved from one or more data sources as input to the corresponding atomic trust factors; and
- computing the composite metadata scores using one or more of the atomic metadata scores as input to the composite trust factors.

15. The computer program product of claim 3 wherein at least one of the composite trust factors uses at least one composite trust score as an input.

16. The computer program product of claim 12 wherein the event notification is a message sent to a separate software process, and wherein the separate software process reacts according to at least one of the trust metadata scores.

17. The computer program product of claim 12 wherein the event notification is a message sent to a person that informs the person that one of the trust metadata scores has reached the identified thresholds.

* * * * *